(12) United States Patent
Biswas et al.

(10) Patent No.: US 12,291,489 B2
(45) Date of Patent: May 6, 2025

(54) SYNTHESIS OF NANOCOMPOSITES AND THEIR USE IN ENHANCING PLANT NUTRITION

(71) Applicants: Pratim Biswas, St. Louis, MO (US); Ramesh Raliya, St. Louis, MO (US)

(72) Inventors: Pratim Biswas, St. Louis, MO (US); Ramesh Raliya, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/314,689

(22) PCT Filed: Jun. 30, 2017

(86) PCT No.: PCT/US2017/040218
§ 371 (c)(1),
(2) Date: Jan. 2, 2019

(87) PCT Pub. No.: WO2018/005930
PCT Pub. Date: Jan. 4, 2018

(65) Prior Publication Data
US 2019/0202750 A1    Jul. 4, 2019

Related U.S. Application Data

(60) Provisional application No. 62/357,670, filed on Jul. 1, 2016, provisional application No. 62/370,814, filed on Aug. 4, 2016.

(51) Int. Cl.
*C05B 17/00*    (2006.01)
*C05B 17/02*    (2006.01)
(Continued)

(52) U.S. Cl.
CPC ............. *C05B 17/00* (2013.01); *C05B 17/02* (2013.01); *C05C 11/00* (2013.01); *C05F 11/08* (2013.01); *C05G 5/27* (2020.02); *B82Y 30/00* (2013.01)

(58) Field of Classification Search
CPC .. C05B 1/00; C05B 1/06; C05B 17/00; C05B 17/02; C05C 11/00; C05C 11/08;
(Continued)

(56) References Cited

U.S. PATENT DOCUMENTS 5,962,553 A * 10/1999 Ellsworth ................ C08K 9/04
                                                            523/213
8,911,526 B2    12/2014 Farrukh et al.
(Continued)

FOREIGN PATENT DOCUMENTS

CN    1413963 A    4/2003
CN    101225010 A    7/2008
(Continued)

OTHER PUBLICATIONS

Milani et al ("Fate of Zinc Oxide Nanoparticles Coated onto Macronutrient Fertilizers in an Alkaline Calcareous Soil", 2015, doi: 10.1371/journal.pone.0126275) (Year: 2015).*
(Continued)

*Primary Examiner* — Jennifer A Smith
(74) *Attorney, Agent, or Firm* — Polsinelli PC

(57) ABSTRACT

The present disclosure is related to the development of improved fertilizer for precision and sustainable agriculture. A method was developed wherein efficient NPK nanocomposite for plant nutrition was synthesized in a single step using aerosol science and technology concepts. Further a formulation was prepared by addition of ZnO, TiO$_2$ and other nanoparticles to the NPK nanocomposite. Also, an
(Continued)

aerosol based foliar application technique was developed for the precise delivery of nanoparticles to the plants.

17 Claims, 23 Drawing Sheets
(17 of 23 Drawing Sheet(s) Filed in Color)

(51) Int. Cl.
| | |
|---|---|
| C05C 11/00 | (2006.01) |
| C05F 11/08 | (2006.01) |
| C05G 5/27 | (2020.01) |
| B82Y 30/00 | (2011.01) |

(58) Field of Classification Search
CPC .... C05C 5/02; C05G 5/27; C05G 5/40; C05G 5/45; C05D 1/00; C05D 1/005; C05D 9/02; C05F 11/08; B82Y 30/00
See application file for complete search history.

(56) References Cited

U.S. PATENT DOCUMENTS

| | | | |
|---|---|---|---|
| 2007/0167554 A1* | 7/2007 | Ryang | C08K 3/34 524/492 |
| 2009/0224985 A1* | 9/2009 | Pohjonen | H01Q 1/40 343/702 |
| 2010/0139347 A1 | 6/2010 | Barati | |
| 2010/0239507 A1 | 9/2010 | Brown et al. | |
| 2011/0135749 A1* | 6/2011 | Sellinger | C08K 5/5425 424/676 |
| 2012/0073341 A1 | 3/2012 | Goodwin | |
| 2013/0219979 A1 | 8/2013 | Deb | |
| 2014/0165683 A1 | 6/2014 | Kottegoda et al. | |
| 2014/0208815 A1* | 7/2014 | Kaiser, II | C05C 9/00 71/32 |

FOREIGN PATENT DOCUMENTS

| | | | | |
|---|---|---|---|---|
| CN | 101973791 A | | 2/2011 | |
| CN | 102217480 B | | 5/2012 | |
| CN | 104072312 A | | 10/2014 | |
| IN | 201621015019 A | * | 5/2016 | C05G 3/00 |
| WO | 2013121244 A1 | | 8/2013 | |
| WO | 2014117147 A1 | | 7/2014 | |
| WO | 2018005930 A1 | | 1/2018 | |

OTHER PUBLICATIONS

Mosaic Crop Nutrition ("Monoammonium Phosphate", 2021, accessed from www.cropnutrition.com (Year: 2021).*
University of Minnesota Extension ("Fertilizer urea", 2021, accessed from www.extensions.umn.edu (Year: 2021).*
Corradini, E., M. R. De Moura, and L. H. C. Mattoso. "A preliminary study of the incorparation of NPK fertilizer into chitosan nanoparticles." Express Polymer Letters 4.8 (2010). (Year: 2010).*
Prasad, T. N. V. K. V., et al. "Effect of nanoscale zinc oxide particles on the germination, growth and yield of peanut." Journal of plant nutrition 35.6 (2012): 905-927. (Year: 2012).*
McCauley, Ann, Clain Jones, and Jeff Jacobsen. "Commercial fertilizers and soil amendments." Nutrient management module 10 (2009): 4449-4410. (Year: 2009).*
Lima, FR1, et al. "Biological evaluations of commercial dicalcium phosphates as sources of available phosphorus for broiler chicks." Poultry science 76.12 (1997): 1707-1713. (Year: 1997).*
Nanowerk. "What are Nanocomposites" <https://www.nanowerk.com/nanocomposites.php> Nov. 25, 2021 (Year: 2021).*
Jillavenkatesa, Ajit, Stanley J. Dapkunas, and Lin-Sien H. Lum. Particle size characterization. No. 960. National Institute of Standards and Technology, 2001. (Year: 2001).*
PharmaGuide. "Difference between Powder and Granules in Pharmaceuticals Industry?" Pharma Guideline. <https://www.pharmaguideline.co.uk/what-is-the-difference-between-powder-and-granules-in-pharmaceuticals-industry/> May 20, 2021 (Year: 2021).*
Albanese, A. et al., "The Effect of Nanoparticle Size, Shape, and Surface Chemistry on Biological Systems," Ann. Rev. Biomed. Eng., 2012, pp. 1-16, vol. 14.
Becker, R., "CTAB promoted synthesis of Au nanorods-Temperature effects and stability considerations," J. Colloid Interface Sci., Mar. 1, 2010, pp. 25-30, vol. 343, No. 1.
Biswas, P. et al., "Nanoparticles and the Environment," J. Air Waste Manag. Assoc., 2005, pp. 708-746, vol. 55, No. 6, Taylor & Francis Group.
Brandt, O. et al., "First observations on break-up of particle agglomerates in shock waves," Exp. Fluids, Mar. 1987, pp. 86-94, vol. 5, No. 2.
Capaldi Arruda, S. et al., "Nanoparticles applied to plant science: A review," Talanta, Jan. 2015, pp. 693-705, vol. 131.
Chen, H. et al., "ACS Select on Nanotechnology in Food and Agriculture: A Perspective on Implications and Applications," J. Agri. Food Chem., Jan. 30, 2014, pp. 1209-1212, vol. 62.
Derosa, M. et al., "Nanotechnology in fertilizers," Nat. Nanotech., Feb. 2010, p. 91, vol. 5.
Eichert, T. et al., "Equivalent pore radii of hydrophilic foliar uptake routes in stomatous and astomatous leaf surfaces—further evidence for a stomatal pathway," Physiologia Planta., Apr. 2008, pp. 491-502, vol. 132, No. 4.
Ghosh, P. et al., "Efficient Gene Delivery Vectors by Tuning the Surface Charge Density of Amino Acid-Functionalized Gold Nanoparticles," NIH Public Access Author Manuscript, Feb. 17, 2009, pp. 1-14, published in final edited form as: ACS Nano, Nov. 25, 2008, pp. 2213-2218, vol. 2, No. 11.
Giaquinta, R., "Phloem Loading of Sucrose," Ann. Rev. Plant Physiol., 1983, pp. 347-387, vol. 34.
Gonzalez-Melendi, P. et al., "Nanoparticles as Smart Treatment-delivery Systems in Plants: Assessment of Different Techniques of Microscopy for their Visualization in Plant Tissues," Annal. Botany, Jan. 2008, pp. 187-195, vol. 101, No. 1, Oxford University Press.
Hautier, Y. et al., "Eutrophication weakens stabilizing effects of diversity in natural grasslands," Nature, Apr. 25, 2014, pp. 521-525, vol. 508.
International Search Report and Written Opinion dated Sep. 28, 2017 from related Patent Application No. PCT/US2017/040218; 9 pgs.
Jiang, J. et al., "Does Nanoparticle Activity Depend upon Size and Crystal Phase?," NIH Public Access Author Manuscript, Sep. 7, 2010, pp. 1-17, published in final edited form as: Nanotoxicol., Mar. 2008, pp. 33-42, vol. 2, No. 1.
Liu, R. et al., "Synthetic apatite nanoparticles as a phosphorus fertilizer for soybean (*Glycine max*)," Scientific Rep., 2014, pp. 1-6, vol. 4, No. 5686.
Liu, R. et al., "Potentials of engineered nanoparticles as fertilizers for increasing agronomic production," Sci. Total Env., 2015, pp. 131-139, vol. 514, Elsevier B.V.
Nair, R. et al., "Nanoparticulate material delivery to plants," Plant Sci., 2010, pp. 154-163, vol. 179.
Peng, J. et al., "Upconversion Nanoparticles Dramatically Promote Plant Growth Without Toxicity," Nano Res., Nov. 2012, pp. 770-782, vol. 5, No. 11.
Raliya, R. et al., "ZnO Nanoparticle Biosynthesis and Its Effect on Phosphorous-Mobilizing Enzyme Secretion and Gum Contents in Clusterbean (*Cyamopsis tetragonoloba* L.)," Agr. Res., Mar. 2013, pp. 48-57, vol. 2, No. 1.
Raliya, R. et al., "MgO Nanoparticles Biosynthesis and Its Effect on Chlorophyll Contents in the Leaves of Clusterbean (*Cyamopsis tetragonoloba* L.)," Adv. Sci., Eng. Med., 2014, pp. 538-545, vol. 6, No. 5, American Scientific Publishers.
Raliya, R. et al, "TiO2 nanoparticle biosynthesis and its physiological effect on mung bean (*Vigna radiata* L.)," Biotechnol. Rep., Mar. 2015, pp. 22-26, vol. 5.
Raliya, R. et al., "Mechanistic evaluation of translocation and physiological impact of titanium dioxide and zinc oxide nanoparticles

(56) References Cited

OTHER PUBLICATIONS on the tomato (*Solanum lycopersicum* L.) plant," Metallomics, 2015, pp. 1584-1594, vol. 7, No. 12, with Supplementary Information, 7 pgs.

Raliya, R. et al, "Perspective on Nanoparticle Technology for Biomedical Use," Curr. Pharm. Des., 2016, pp. 2481-2490, vol. 22, No. 17.

Raliya, R. et al, "Enhancing the Mobilization of Native Phosphorus in the Mung Bean Rhizosphere Using ZnO Nanoparticles Synthesized by Soil Fungi," J. Agric. Food Chem., Apr. 2016, pp. 3111-3118, vol. 64, No. 16.

Saharan, V. et al., "Synthesis and in vitro antifungal efficacy of Cu-chitosan nanoparticles against pathogenic fungi of tomato," Int. J. Biol. Macromol., Apr. 2015, pp. 346-353, vol. 75.

Scheffer, A. et al., "ICP-MS as a new tool for the determination of gold nanoparticles in bioanalytical applications," Anal. Bioanal. Chem., Jan. 2008, pp. 249-252, vol. 390, No. 1.

Schwab, F. et al., "Barriers, pathways and processes for uptake, translocation and accumulation of nanomaterials in plants—Critical review," Nanotoxicol., 2016, pp. 257-278, vol. 10, No. 3, Informa UK Ltd.

Shukla, R. et al., "Biocompatibility of Gold Nanoparticles and Their Endocytotic Fate Inside the Cellular Compartment: A Microscopic Overview," Langmuir, 2005, pp. 10644-10654, vol. 21, No. 23.

Smith, V. et al., "Eutrophication: impacts of excess nutrient inputs on freshwater, marine, and terrestrial ecosystems," Env. Pollut., 1999, pp. 179-196, vol. 100.

Tarafdar, J. et al., "Development of Zinc Nanofertilizer to Enhance Crop Production in Pearl Millet (*Pennisetum americanum*)," Agri. Res., Sep. 2014, pp. 257-262, vol. 3, No. 3.

Thakor, A. et al., "Gold Nanoparticles: A Revival in Precious Metal Administration to Patients," Nano Lett., 2011, pp. 4029-4036, vol. 11, No. 10.

Wang, Z. et al., "Xylem- and Phloem-Based Transport of CuO Nanoparticles in Maize (*Zea mays* L.)," Environ. Sci. Technol., 2012, pp. 4434-4441, vol. 46.

Wang, W-N. et al., "Nanoparticle synthesis and delivery by an aerosol route for watermelon plant foliar uptake," J. Nanopart. Res., 2013, pp. 1-13, vol. 15, No. 1417.

Wei, J. et al., "Miniaturized Paper-Based Gene Sensor for Rapid and Sensitive Identification of Contagious Plant Virus," ACS Appl. Mater. Interfaces, 2014, pp. 22577-22584, vol. 6. No. 24.

Wibowo, D. et al., "Sustained Release of Fipronil Insecticide in Vitro and in Vivo from Biocompatible Silica Nanocapsules," J. Agric. Food Chem., 2014, pp. 12504-12511, vol. 62, No. 52, Accepted Author Manuscript.

Wu, H-L. et al., "Seed-Mediated Synthesis of Gold Nanocrystals with Systematic Shape Evolution from Cubic to Trisoctahedral and Rhombic Dodecahedral Structures," Langmuir, 2010, pp. 12307-12313, vol. 26, No. 14.

Yang, Y. et al., "Metal and nanoparticle occurrence in biosolid-amended soils," Sci. Total Environ., 2014, pp. 441-449, vols. 485-486.

Zhao, W. et al., "Rapid on-site detection of *Acidovorax avenae* subsp. citrulli by gold-labeled DNA strip sensor," Biosens. Bioelectron., Jun. 2011, pp. 4241-4244, vol. 26, No. 10.

\* cited by examiner

FIG. 1

SYNTHESIS OF NANOCOMPOSITES AND THEIR USE IN ENHANCING PLANT NUTRITION

CROSS REFERENCE TO RELATED APPLICATIONS

This application claims the benefit of of PCT Application PCT/US2017/040218, filed Jun. 30, 2017, which claims priority from U.S. Provisional Application No. 62/357,670 filed Jul. 1, 2016 and U.S. Provisional Application No. 62/370,814 filed Aug. 4, 2016; each of the disclosures of which is hereby incorporated by reference in its entirety.

GOVERNMENTAL RIGHTS

This invention was made with government support under ECS-0335765 awarded by the National Science Foundation. The government has certain rights in the invention.

FIELD OF THE INVENTION

The present disclosure is related to the development of improved fertilizer for precision and sustainable agriculture. A method was developed wherein efficient NPK nanocomposite for plant nutrition was synthesized in a single step using aerosol science and technology concepts. Further a formulation was prepared by addition of ZnO, $TiO_2$, and other nanoparticles to the NPK nanocomposite.

BACKGROUND OF THE INVENTION

With the world's population expected to exceed nine billion by 2050, scientists are working to develop new ways to meet rising global demand for food, energy and water without increasing the strain on natural resources. Organizations including the World Bank and the U.N. Food and Agriculture Organization are calling for more innovations to address the links between these sectors, often referred to as the food-energy-water nexus.

Increased phosphorous fertilizer application and irrigation results in a greater yield of crops. Fertilizer use worldwide is increasing along with global population growth. Currently, farmers are using nearly 85 percent of the world's total mined phosphorus as fertilizer, although plants can uptake only an estimated 42 percent of the phosphorus that is applied to soil. If these practices continue, the world's supply of phosphorus could run out within the next 80 years, worsening nutrient pollution problems in the process. In addition to phosphorus, plants require and farmers apply other nutrients in very high amount, such as nitrogen and potassium.

Thus, there is a need in the art to develop a technology for precision farming making agriculture more sustainable and economically viable.

BRIEF DESCRIPTION OF THE FIGURES

The application file contains at least one drawing executed in color. Copies of this patent application publication with color drawing(s) will be provided by the Office upon request and payment of the necessary fee.

FIG. 1 depicts a schematic of the experimental set-up design for the synthesis of NPK nanocomposite

FIG. 3A and FIG. 3B were imaged from the same sample at different magnification scale.

(FIG. 12A) Hydrodynamic size measurements performed using light scattering (DLS) technique (FIG. 12B) Online measurements of number concentrations of particles, monitored by Scanning Mobility Particle Sizer (SMPS).

(FIG. 14A) Number of particles recovered in sections of aerosol-treated plants normalized to SMPS number concentration of particles. (FIG. 14B) Schematic of translocation of nanoparticles from leaf to root by phloem transport. Inset: gas phase uptake of nanoparticles through stomata opening.

DETAILED DESCRIPTION OF THE INVENTION

Figure 2A:
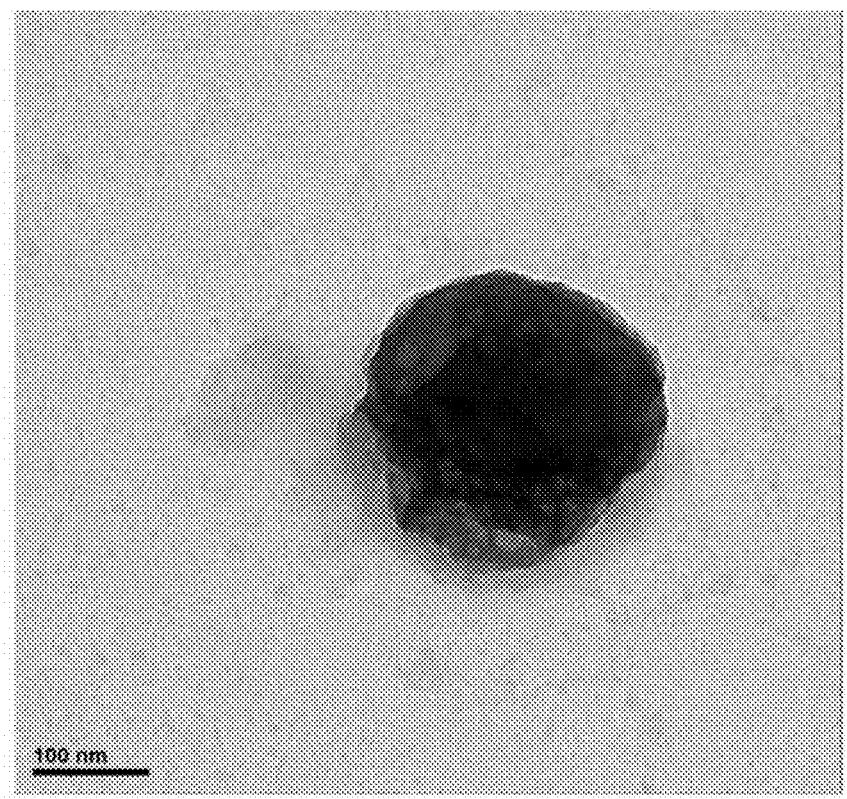
FIG. 2A and FIG. 2B depict TEM characterization of synthesized NPK nanocomposite. The synthesized particles are able to dissolve rapidly in water. Micrograph recorded before (FIG. 2A) and after (FIG. 2B) dispersion in water. Rapid dissolution helps plants to uptake particles by the leaf surface.

Provided herein is a method to synthesize a nanocomposite of nitrogen (N), phosphorous (P), and potassium (K) using a single step aerosol approach. The nanocomposite can be referred to as a NPK nanocomposite. This method makes stable nanoparticles comprising a bioavailable form of nutrients for plant uptake. Stability was measured by determining shape, size, and composition of the nanocomposites over time. No changes were observed when synthesizing nanocomposites using methods of the disclosure. Further, this method is easily scaled, minimizes downstream processing, and is cost-effective. Specifically, the method requires less starting material relative to conventional fertilizers, produces no harmful byproduct, requires less time and energy, and is a single step synthesis process requiring less manpower. The NPK nanocomposite material formed can be combined with other nanoparticles (zinc oxide and/or titanium dioxide) and can be used to boost plant growth and development. A composition can be customized based on the formulation ratio, particle size and crystal phase of the other nanoparticles used in combination with the NPK nanocomposite. The dosage amount and delivery approach can be optimized based on the composition delivered and plant treated.

Currently, phosphorous is applied to the soil as mono- or di-ammonium phosphate. In particular, phosphorous is mined as rock phosphate. When nutrients are applied to the soil, due to low solubility and larger particle size, the majority of the nutrient either runs-off or makes complexes with the soil such that plant nutrient uptake is limited. The available phosphorous for plants by conventional fertilizer is limited to about 20% or less. To enhance NPK content and make these nutrients readily available for the plants, provided herein are NPK nanocomposites. The compositions and methods disclosed herein have the potential to solve the problems of overuse of phosphorous mining and will minimize the risk of chemical contamination in the food chain. Accumulation of metal nanoparticles was not observed in the edible part of the plant and any accumulation identified in the non-edible part was within the limit recommended by the United States Department of Agriculture.

I. NPK Nanocomposite

In an aspect, the disclosure provides a nanocomposite comprising macronutrients and/or micronutrients useful for enhancing plant nutrition. In another aspect, the disclosure provides a nanocomposite comprising nitrogen, phosphorous and potassium. In still another aspect, the disclosure provides a nanocomposite consisting essentially of nitrogen, phosphorous and potassium. The nanocomposite has at least about 5% available phosphorous. For example, the nanocomposite has at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, or at least about 80% available phosphorous. Alternatively, the nancomposite has about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% available phosphorous. Specifically, the nanocomposite has about 55% available phosphorous.

The nanocomposite has at least about 5% nitrogen. For example, the nanocomposite has at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80% nitrogen. Alternatively, the nancomposite has about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% nitrogen. Specifically, the nanocomposite has about 23% nitrogen.

The nanocomposite has at least about 5% potassium. For example, the nanocomposite has at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80% potassium. Alternatively, the nancomposite has about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% potassium. Specifically, the nanocomposite has about 22% potassium.

The nanocomposite has a particle size of about 100 nm. For example, the nanocomposite has a particle size of about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, about 130 nm, about 135 nm, about 140 nm, about 145 nm, about 150 nm, about 160 nm, about 170 nm, about 180 nm, about 190 nm, about 200 nm, about 210 nm, about 220 nm, about 230 nm, about 240 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1000 nm. Alternatively, the nanocomposite has a particle size of about 50 nm to about 200 nm, about 50 nm to about 150 nm, about 75 nm to about 125 nm, about 80 nm to about 120 nm, or about 90 nm to about 100 nm.

The nanocomposite can further comprise additional macronutrients and/or micronutrients. Non-limiting examples of macronutrients include nitrogen (N), phosphorous (P), potassium (K), sulfur (S), magnesium (Mg), calcium (Ca), and a precursor thereof. Non-limiting examples of micronutrients include boron (Bo), copper (Cu), iron (Fe), chloride (CI), manganese (Mn), molybdenum (Mo), zinc (Zn), and a precursor thereof. Further, the nanocomposite can further comprise nutrients including, but not limited to, nickel, aluminum, silicon, carbon (graphene oxide and graphene), titanium dioxide and silver. For example, the nanocomposite can further comprise one or more additional macronutrient and/or micronutrient selected from the group consisting of sulphur, magnesium, calcium, boron, copper, iron, chloride, manganese, molybdenum, zinc, nickel, aluminum, silicon, carbon (graphene oxide and graphene), titanium dioxide, silver, and a precursor thereof. The one or more one or more additional macronutrient and/or micronutrient can be part of the nanocomposite or can be part of a composition comprising the nanocomposite but not part of the nanocomposite or can be part of the composition comprising the nanocomposite and part of the nanocomposite.

In another aspect, the disclosure provides a composition comprising the nanocomposite and metal or metal oxide nanoparticles. The metal or metal oxide nanoparticles can be spherical, cubic, rhombic dodecahedral or rod shaped. The shape of the nanoparticle can depend on the route of delivery to the plant. Without being limited by theory, application of nanoparticles by the aerosol method is most effective with structures with low aspect ratio, resulting in greater translocation and conversely, the drop-cast method results in higher translocation of structures with a higher aspect ratio than other morphologies tested. For example, for drop-cast application methods, a trend in the efficacy of translocation can be rod>sphere>rhombic dodecahedral>cube, whereas, a trend for aerosol route applied particles can be cube>rhombic dodecahedral>sphere>rod. The metal or metal oxide nanoparticles have a particle size of about 25 nm. For example, the metal or metal oxide nanoparticles have a particle size of about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, about 130 nm, about 135 nm, about 140 nm, about 145 nm, or about 150 nm. Alternatively, the metal or metal oxide nanoparticles have a particle size of about 10 nm to about 50 nm, about 15 nm to about 40 nm, or about 20 nm to about 30 nm. Non-limiting examples of suitable metal nanoparticles include gold, silver, copper, aluminum, nickel, chromium, iron, cobalt, tin, titanium, silicon, zinc, lead, platinum, palladium, rhodium, tantalum, ruthenium, tungsten, an alloy thereof, an oxide thereof, or a combination thereof. In an embodiment, metal nanoparticles are selected from the group consisting of silver, gold, copper, zinc, titanium, nickel, silicon, and oxides thereof. Non-limiting examples of suitable metal oxide nanoparticles include ZnO, $TiO_2$, $Fe_3O_4$, FeO, $Fe_2O_3$, $Cu_2O$, CuO, $SiO_2$, $SiO_4$, $AlO_4$, $Al_2O_3$, NiO, $Ni_2O_3$, and MgO. In an embodiment, the composition comprises the nanocomposite and ZnO and/or $TiO_2$ nanoparticles. In a specific embodiment, the composition comprises the nanocomposite and ZnO and $TiO_2$ nanoparticles.

In another aspect, the disclosure provided a composition comprising a nanocomposite comprising nitrogen, phosphorous and potassium. In another aspect, the disclosure provides a composition comprising a nanocomposite consisting essentially of nitrogen, phosphorous and potassium. In one embodiment, the nanocomposite can be dispersed in an aqueous medium to form a composition comprising the nanocomposite. Additionally, the nanocomposite and metal or metal oxide nanoparticles can be dispersed in an aqueous medium to form a composition comprising the nanocomposite and metal or metal oxide nanoparticles. As described above, the nanocomposite and, optionally, metal or metal oxide nanoparticles can be dispersed in an aqueous medium comprising one or more additional macronutrient and/or micronutrient to form a composition. In some embodiments, the aqueous medium includes water.

To prepare a composition comprising a nanocomposite and metal or metal oxide nanoparticles of the disclosure, the metal or metal oxide nanoparticles may first be dispersed in an aqueous medium. In certain embodiments, the aqueous medium is water. A nanocomposite of the disclosure may then be added to the nanoparticles dispersed in water. The composition comprising nanocomposites and metal or metal oxide nanoparticles dispersed in an aqueous medium may be mixed at a stirring rate of about 100 rpm. The composition may have a pH of about 5.0 to about 7.0. For example, the composition may have a pH of about 5.5 to about 6.5, or a pH of about 5.8 to about 6.5. Further, the composition may have a pH of about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, or about 7.0. The composition may be at a temperature of about 25° C. to about 35° C. For example, the composition may be at a temperature of about 25° C., about 26° C., about 27° C., about 28° C., about 29° C., about 30° C., about 31° C., about 31° C., about 33° C., about 34° C., or about 35° C. At the recited pH and temperature range, the composition can be stored in a dark, dry place. Specifically, the composition is prepared at the time of delivery to a plant. Delivery of a composition of the disclosure to a plant is described in greater detail below.

II. Method of Making a NPK Nanocomposite

Figure 1:
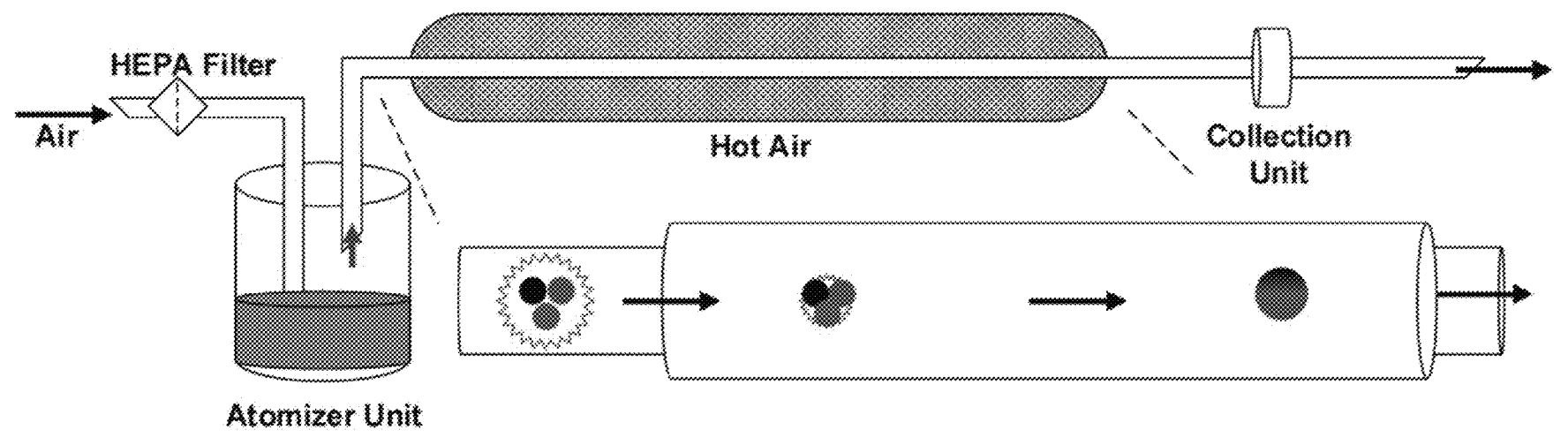

In another aspect, the disclosure provides a method of making a nanocomposite comprising nitrogen, phosphorous and potassium. The method of making the nanocomposite comprises use of a furnace aerosol reactor technique. A schematic of the experimental set-up for the synthesis of the nanocomposite is depicted in FIG. 1. In an embodiment, a Furnace Aerosol Reactor comprises an atomizer unit, hot air oven and a collection unit. The reactor is designed in such a way that a flow of purified gas (14-50 psi) is directed into an atomizer unit (3-6 jet nebulizers) that generates fine aerosol droplets (about 100 nm to about 3000 nm) of the precursor(s). The fine aerosol droplets are further passed through a hot air (50° C.-1200° C.) oven that causes rapid evaporation of the droplets thereby turning precursor molecules into a stable cluster of NPK nanocomposite that can be collected on a membrane filter or electric precipitator attached to the collection unit. The nanocomposite is then ready for use. Importantly, no further downstream processing is required. Additionally, the method of synthesizing the nanocomposite does not generate any byproduct chemical.

The size of the fine aerosol droplets can be controlled by the concentration of precursors and the flow rate. The final nanocomposite size can be controlled by the residence time and length of the furnace tube. The residence time may be from about 1 microsecond to about 10 milliseconds. The length of the furnace tube may be from about 5 cm to about 100 cm. Accordingly, the length of the furnace tube may be about 5 cm, about 10 cm, about 15 cm, about 20 cm, about 25 cm, about 30 cm, about 35 cm, about 40 cm, about 45 cm, about 50 cm, about 55 cm, about 60 cm, about 65 cm, about 70 cm, about 75 cm, about 80 cm, about 85 cm, about 90 cm, about 95 cm, or about 100 cm. The collected nanocomposite is in powder form and has a moisture content of less than 5%. The moisture content may be less than 4%, less than 3%, less than 2%, or less than 1%. Specifically, the collected nanocomposite has a moisture content of less than 2%.

Precursors for the synthesis of the nanocomposite comprising nitrogen, phosphorous and potassium can include ammonium phosphate and potassium phosphate. However other phosphorous precursors may be used. Non-limiting examples of phosphorous precursors include (1-Acetoxyethyl)ferrocene, (R)-1,1'-Binaphthyl-2,2'-diylphosphorochloridate, (S)-1,1'-Binaphthyl-2,2'-diyl phosphorochloridate, Bis(3,5-di-tert-butyl-4-methoxyphenyl)chlorophosphine, Bis(3,5-di-tert-butyl-4-methoxyphenyl)phosphine, 1,2-Bis(dichlorophosphino)benzene, 1,1'-Bis(dichlorophosphino)ferrocene, Bis(diethylamino)chlorophosphine, Bis(diisopropylamino)chlorophosphine, Bis(3,5-dimethyl-4-methoxyphenyl)chlorophosphine, Bis(3,5-dimethyl-4-methoxyphenyl)chlorophosphine, Bis(3,5-dimethylphenyl)chlorophosphine, Bis(3,5-dimethylphenyl)phosphine, Bis(3,5-di(trifluoromethyl)phenyl)chlorophosphine, Bis(3,5-di(trifluoromethyl)phenyl)phosphine, Bis(2-furyl)phosphine chloride, Bis(2-isopropoxyphenyl)chlorophosphine, Bis(2-isopropoxyphenyl)phosphine, Bis(2-methoxyphenyl)chlorophosphine, Bis(4-methoxyphenyl)chlorophosphine, Bis(4-methoxyphenyl)chlorophosphine, Bis(4-methoxyphenyl)phosphine, Bis(4-methylphenyl)chlorophosphine, Bis(4-trifluoromethylphenyl)phosphine, Bis(2,4,6-trimethylphenyl)phosphine, Bis(2,4,6-trimethylphenyl)phosphorus chloride, Borane diphenylphosphine complex, Bromodiphenylphosphine, tert-Butylchloro(methyl)phosphine, tert-Butyldichlorophosphine, tert-Butyldimethylphosphine borane, tert-Butylphenylphosphine, tert-Butylphosphonic dichloride, 2-Chloro-1,3,2-benzodioxaphosphorin-4-one, Chloro(tert-butyl)phenylphosphine, Chlorodicyclohexylphosphine, Chlorodicyclopentylphosphine, Chlorodiethylphosphine, Chlorodiisopropylphosphine, 2-Chloro-1,3,2-dioxaphospholane, Chlorodiphenylphosphine, P-Chlorodiphenylphosphine, Chlorodi(o-tolyl)phosphine, 4-Chlorophenyl dichlorophosphate, 2-Chloro-4,4,5,5-tetramethyl-1,3,2-dioxaphospholane, Cyclohexyldichlorophosphine, Di(1-adamantyl)chlorophosphine, Di-tert-butylchlorophosphine, Di-tert-butylphosphine, Dichloroethylphosphine, Dichloroisopropylphosphine, Dichloromethylphosphine, P,P-Dichlorophenylphosphine, Dicyclohexylphosphine, Dicyclopentylphosphine, Diethylphosphoramidous dichloride, N,N-Diisopropylmethylphosphonamidic chloride, Diisopropylphosphoramidous dichloride, 5,5-Dimethyl-1,3,2-dioxaphosphorinan-2-one, Dimethyl phenylphosphonite, Diphenylphosphine, Diphenylphosphine oxide, Diphenylphosphinic chloride, 3-(Diphenylphosphino)propionic acid, Diphenyl(trimethylsilyl)phosphine, Diphosphoryl chloride, Di(o-tolyl)phosphine, Divinylphenylphosphine, Ethyl diphenylphosphinite, 0-Ethyl methylphosphonothioate, Iodo[4,5-bis(diphenylphosphino)-9,9-dimethylxanthene]copper(I), Lithium diphenylphosphide, Methyl diphenylphosphinite, 3-Methyl-1-phenyl-2-phospholene 1-oxide, Methylphosphonic dichloride, Methyl N,N,N',N'-tetraisopropylphosphorodiamidite, o-Phenylene phosphorochloridate, o-Phenylene phosphorochloridite, Phenyl N-phenylphosphoramidochloridate, Phenylphosphonic dichloride, Phenylphosphonic dichloride, Phosphine, Potassium diphenylphosphide, Tetraisopropyl vinylidenediphosphonate, and (2,4,6-Tri-tert-butylphenyl)phosphine.

The concentration of precursor can range from about 0.1 M to about 1 M. For example, the concentration of the precursor can range from about 0.25 M to about 0.75 M. Alternatively, the concentration of precursor can be about 0.1 M, 0.15 M, about 0.2 M, about 0.25 M, about 0.3 M, about 0.35 M, about 0.4 M, about 0.45 M, about 0.5 M, about 0.55 M, about 0.6 M, about 0.65 M, about 0.7 M, about 0.75 M, about 0.8 M, about 0.85 M, about 0.9 M, about 0.95 M, or about 1 M.

The precursors can be mixed in a ratio of about 1:1. For example, the precursors can be mixed in a ratio of about 0.5:1, about 0.6:1, about 0.7:1, about 0.8:1, about 0.9:1, about 1:1, about 1.1:1, about 1.2:1, about 1.3:1, about 1.4:1, or about 1.5:1.

Synthesis of the nanocomposite can occur at about 25° C. to about 250° C. For example, synthesis of the nanocomposite can occur at about 50° C. to about 200° C., about 75° C. to about 175° C., or about 100° C. to about 150° C. Alternatively, synthesis of the nanocomposite can occur at about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 125° C., about 150° C., about 175° C., about 200° C., about 225° C., or about 250° C.

Synthesis of the nanocomposite can occur at an atomizing pressure of about 40 PSI. For example, synthesis of the nanocomposite can occur at an atomizing pressure of about 30 PSI to about 50 PSI. Alternatively, synthesis of the nanocomposite can occur at an atomizing pressure of about 14 PSI, about 15 PSI, about 20 PSI, about 25 PSI, about 30 PSI, about 35 PSI, about 40 PSI, about 45 PSI, or about 50 PSI.

The disclosure also provides a method of customizing a nanocomposite and/or a composition comprising a nanocomposite to a plant. The method comprises determining the amount of macronutrients and/or micronutrients needed by the plant and synthesizing a nanocomposite as described above based on these amounts. Specifically, the method comprises determining the amount of nitrogen, phosphorous and potassium needed by the plant and synthesizing a nanocomposite as described above based on these amounts. For example, the type, amount and/or ratio of precursor can be adjusted to accommodate various amounts of macronutrients and/or micronutrients present in the nanocomposite. Specifically, the type, amount and/or ratio of precursor can be adjusted to accommodate various amounts of nitrogen, phosphorous and potassium present in the nanocomposite. Further, if additional macronutrients and/or micronutrients are to be incorporated into the nanocomposite based on the needs of the plant, the type, amount and/or ratio of precursor can be adjusted to accommodate various macronutrients and/or micronutrients present in the nanocomposite. Still further, if the composition comprising a nanocomposite also comprises a metal or metal oxide nanoparticle, the ratio/amount of nanoparticle added, size of nanoparticle, shape of nanoparticle, and/or type of nanoparticle can be modified based on the needs of the plant. Additionally, the components of the composition with which the nanocomposites are dispersed in can be modified based on the needs of the plant. For example, the nanocomposite, and optionally metal or metal oxide nanoparticle, can be dispersed in water comprising macronutrients and/or micronutrients based on the needs of the plant. In this manner, a nanocomposite and/or a composition comprising a nanocomposite can be customized for delivery to a plant based on the specific needs of the plant.

III. Method of Use

In an aspect, the disclosure provides a method of delivering a nanocomposite of the disclosure or a composition comprising a nanocomposite of the disclosure to a plant. The nanocomposite of the disclosure or the composition comprising a nanocomposite of the disclosure can be delivered to a plant via aerosol, drop-cast, spray, hydroponics, aeroponics, seed treatment, seedling root dipping, soil application, nutrient for tissue culture, in vitro culture, application with irrigation water, or a combination thereof. A nanocomposite of the disclosure or a composition comprising a nanocomposite of the disclosure can be delivered to the soil of the foliar of the plant. Specifically, a nanocomposite of the disclosure or a composition comprising a nanocomposite of the disclosure is delivered to the foliar of the plant. More specifically, a nanocomposite of the disclosure or a composition comprising a nanocomposite of the disclosure is delivered to the foliar of the plant via aerosol delivery.

In another aspect, the disclosure provides a method of increasing plant growth. The method comprises delivering a nanocomposite of the disclosure or a composition comprising a nanocomposite of the disclosure to a plant. The delivery can be as described above. Non-limiting examples of measuring an increase in plant growth include visual growth, light absorption, fresh weight of biomass, plant height, root length, root area, root diameter, root nodule, activity of phosphorous-mobilizing enzymes (acid phophatase, alkaline phophatase and phytase), soil microbial population indicator enzyme (dehydrogenase), microbial community population (bacteria, fungi, actinomycetes), phosphorous uptake, chlorophyll content, and protein content. Accordingly, the disclosure provides a method of increasing light absorption, increasing fresh weight biomass, increasing plant height, increasing root length, increasing root area, increasing root diameter, increasing root nodule, increasing activity of phosphorous-mobilizing enzymes, increasing soil microbial population indicator enzyme, increasing phosphorous uptake, increasing chlorophyll content, and/or increasing protein content.

Specifically, the disclosure provides a method to increase fresh weight biomass. Following delivery of a nanocomposite of the disclosure or a composition comprising a nanocomposite of the disclosure to a plant, the biomass can increase by greater than 25% relative to a plant not administered fertilizer. For example, the biomass can increase by greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% relative to a plant not administered fertilizer. Alternatively, following delivery of a nanocomposite of the disclosure or a composition comprising a nanocomposite of the disclosure to a plant, the biomass can increase by greater than 1% relative to a plant not administered fertilizer. For example, the biomass can increase by greater than 2%, greater than 3%, greater than 4%, greater than 5%, greater than 6%, greater than 7%, greater than 8%, greater than 9%, greater than 10%, greater than 11%, greater than 12%, greater than 13%, greater than 14%, greater than 15%, greater than 16%, greater than 17%, greater than 18%, greater than 19%, greater than 20%, greater than 21%, greater than 22%, greater than 23%, greater than 24%, greater than 25%, greater than 26%, greater than 27%, greater than 28%, greater than 29%, greater than 30%, greater than 35%, greater than 40%, greater than 45%, or greater than 50% relative to a plant administered conventional fertilizer.

A nanocomposite of the disclosure can be administered at about 25-fold less than conventional fertilizer. For example, a nanocomposite of the disclosure can be administered at about 2-fold, about 3-fold, about 4-fold, about 5-fold, about 10-fold, about 15-fold, about 20-fold, about 21-fold, about 22-fold, about 23-fold, about 24-fold, about 25-fold, about 26-fold, about 27-fold, about 28-fold, about 29-fold, about 30-fold, about 31-fold, about 32-fold, about 33-fold, about 34-fold, about 35-fold, about 40-fold, 4 about 5-fold, or about 50-fold less than conventional fertilizer. Specifically, a nanocomposite of the disclosure can be administered at about 27-fold less than conventional fertilizer.

A nanocomposite of the disclosure can be administered at about 100 mg/kg. For example, a nanocomposite of the disclosure can be administered at about 0.1 mg/kg to about 1000 mg/kg, about 10 mg/kg to about 1000 mg/kg, about 50 mg/kg to about 500 mg/kg, about 50 mg/kg to about 250 mg/kg, about 50 mg/kg to about 100 mg/kg, about 100 mg/kg to about 500 mg/kg, or about 100 mg/kg to about 250 mg/kg. Additionally, a nanocomposite of the disclosure can be administered at about 0.1 mg/kg, about 0.5 mg/kg, about 1 mg/kg, about 5 mg/kg, about 10 mg/kg, about 15 mg/kg, about 20 mg/kg, about 25 mg/kg, about 30 mg/kg, about 35 mg/kg, 4 about 0 mg/kg, about 45 mg/kg, about 50 mg/kg, about 55 mg/kg, about 60 mg/kg, about 65 mg/kg, about 70 mg/kg, about 75 mg/kg, about 80 mg/kg, about 85 mg/kg, about 90 mg/kg, about 95 mg/kg, about 100 mg/kg, about 110 mg/kg, about 120 mg/kg, about 130 mg/kg, about 140 mg/kg, about 150 mg/kg, about 175 mg/kg, about 200 mg/kg, about 225 mg/kg, about 250 mg/kg, about 300 mg/kg, about 350 mg/kg, about 400 mg/kg, about 450 mg/kg, about 500 mg/kg, about 600 mg/kg, about 700 mg/kg, about 800 mg/kg, about 900 mg/kg, or about 1000 mg/kg.

Metal or metal oxide nanoparticles can be administered at less than about 10 mg/kg. For example, metal or metal oxide nanoparticles can be administered at less than about 20 mg/kg, less than about 15 mg/kg, less than about 10 mg/kg, less than about 9 mg/kg, less than about 8 mg/kg, less than about 7 mg/kg, less than about 6 mg/kg, less than about 5 mg/kg, less than about 4 mg/kg, less than about 3 mg/kg, less than about 2 mg/kg, less than about 1 mg/kg. Alternatively, metal or metal oxide nanoparticles can be administered at about 0.1 mg/kg to about 1000 mg/kg, about 10 mg/kg to about 1000 mg/kg, about 50 mg/kg to about 500 mg/kg, about 50 mg/kg to about 250 mg/kg, about 50 mg/kg to about 100 mg/kg, about 100 mg/kg to about 500 mg/kg, or about 100 mg/kg to about 250 mg/kg. Additionally, metal or metal oxide nanoparticles can be administered at about 0.1 mg/kg, about 0.5 mg/kg, about 1 mg/kg, about 5 mg/kg, about 10 mg/kg, about 15 mg/kg, about 20 mg/kg, about 25 mg/kg, about 30 mg/kg, about 35 mg/kg, about 40 mg/kg, about 45 mg/kg, about 50 mg/kg, about 55 mg/kg, about 60 mg/kg, about 65 mg/kg, about 70 mg/kg, about 75 mg/kg, about 80 mg/kg, about 85 mg/kg, about 90 mg/kg, about 95 mg/kg, about 100 mg/kg, about 110 mg/kg, about 120 mg/kg, about 130 mg/kg, about 140 mg/kg, about 150 mg/kg, about 175 mg/kg, about 200 mg/kg, about 225 mg/kg, about 250 mg/kg, about 300 mg/kg, about 350 mg/kg, about 400 mg/kg, about 450 mg/kg, about 500 mg/kg, about 600 mg/kg, about 700 mg/kg, about 800 mg/kg, about 900 mg/kg, or about 1000 mg/kg. In an embodiment wherein ZnO and/or $TiO_2$ nanoparticles are included in the composition, the amount of nanocomposite delivered to the plant may be reduced due to the enhanced uptake of phosphorous in the presence of ZnO and/or $TiO_2$ nanoparticles. This may apply to any other metal or metal oxide nanoparticles that enhance phosphorous uptake.

A nanocomposite of the disclosure or a composition comprising a nanocomposite of the disclosure can be delivered to a plant daily or once, twice, three times or more per week or per month, as needed as to improve plant growth effectively. The timing of administration and duration of administration will be determined by the circumstances surrounding the case. For example, based on the plant, season, conditions, weather, soil, time of day, growth stage, etc.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1. Synthesis and Characterization of NPK Nanocomposite

Provided herein is a process to make a nanocomposite of Nitrogen (N), Phosphorous (P) and Potassium (K). Nitrogen, phosphorous and potassium are essential and major nutrients required by plants. Globally, natural resources for these elements, in particular phosphorous are at an alarming stage. The trends of fertilizer mining and consumption show that demand and application of fertilizer is increasing to enhance crop production. Currently, phosphorous is applied to soil as mono- or di-ammonium phosphate, nitrogen is applied as urea, and potassium is often added as potassium hydrogen phosphate or other similar compounds. In particular, the source of phosphorous is mined rock phosphate. When the nutrients are applied in the soil, due to low solubility and larger particle size (micron scale), a major portion of the nutrients either runs-off or makes complexes in the soil so that the plant nutrient uptake rate is limited. The available phosphorous for plants provided by conventional fertilizers is limited to about 20% or less. To enhance the nitrogen, phosphorous, and potassium nutrient content and make them readily available for plants to uptake, a process was developed to make nanoscale (~100 nm) NPK composite. The composite has nearly 53% available phosphorous which is more than double of what one can achieved by conventional fertilizer. The NPK synthesis was carried out in a Furnace Aerosol Reactor set-up and customized by the inventors (FIG. 1). Experimental parameters include: ammonium phosphate and potassium phosphate precursor at a concentration of 0.1 to 1 M and a ratio of 1:1, a temperature of room temperature to 250° C., an atomizing pressure of 40 PSI, and a droplet size of 200 nm to a few (2-3) microns. The NPK nanocomposite has the desired properties of small particle size, rapid solubility, bioavailable NPK, no stabilizing agent, chemical purity, and chemical stability. NPK nanocomposite disclosed herein has the potential to solve the problems of overuse of phosphorous mining. Further, optimized particle size and more NPK content by mass than conventional fertilizer will minimize the risk of chemical contamination in the food chain.

Figure 2B:
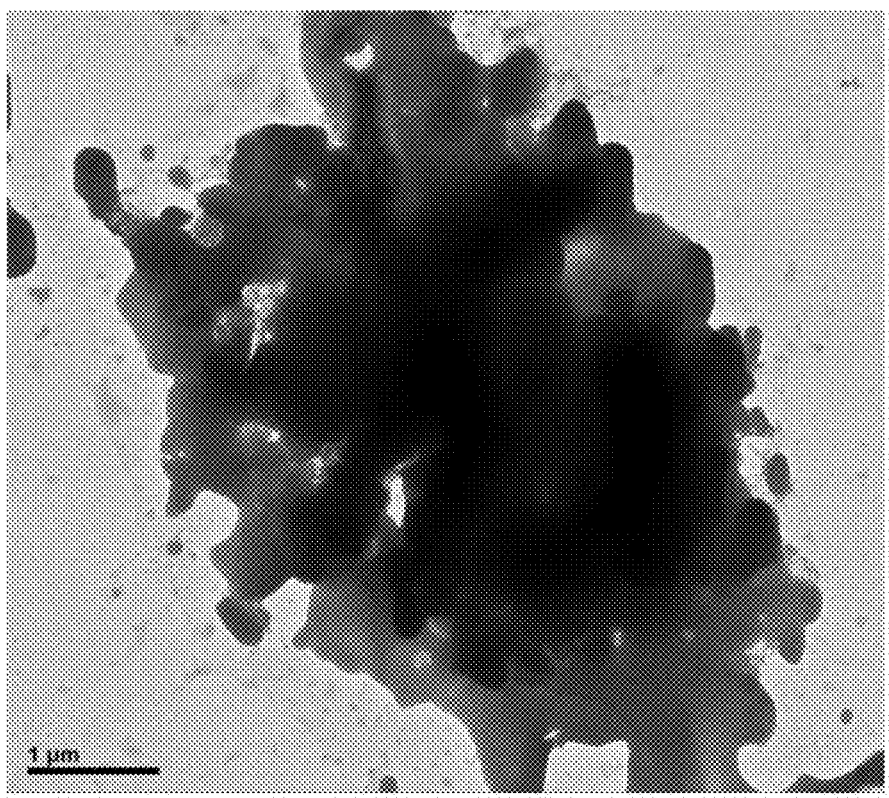
Figure 3A:
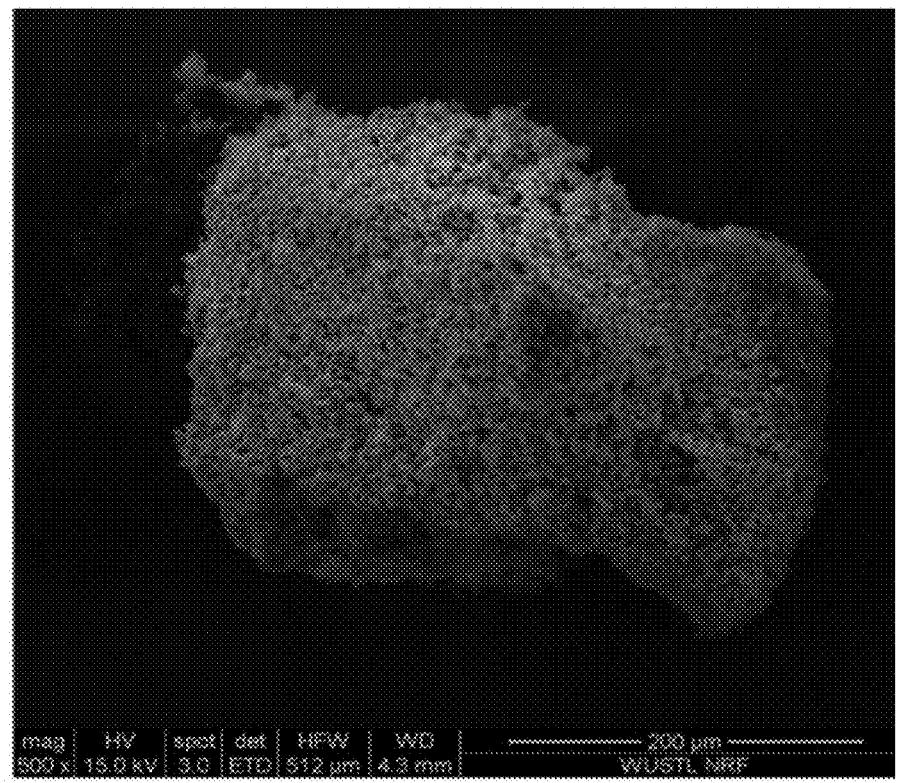
FIG. 3A and FIG. 3B depict SEM characterization of NPK nanocomposite synthesized from FuAR reactor. The NPK particles seem aggregated because they are collected on the element free membrane filter in the sample collection unit.
Figure 3B:
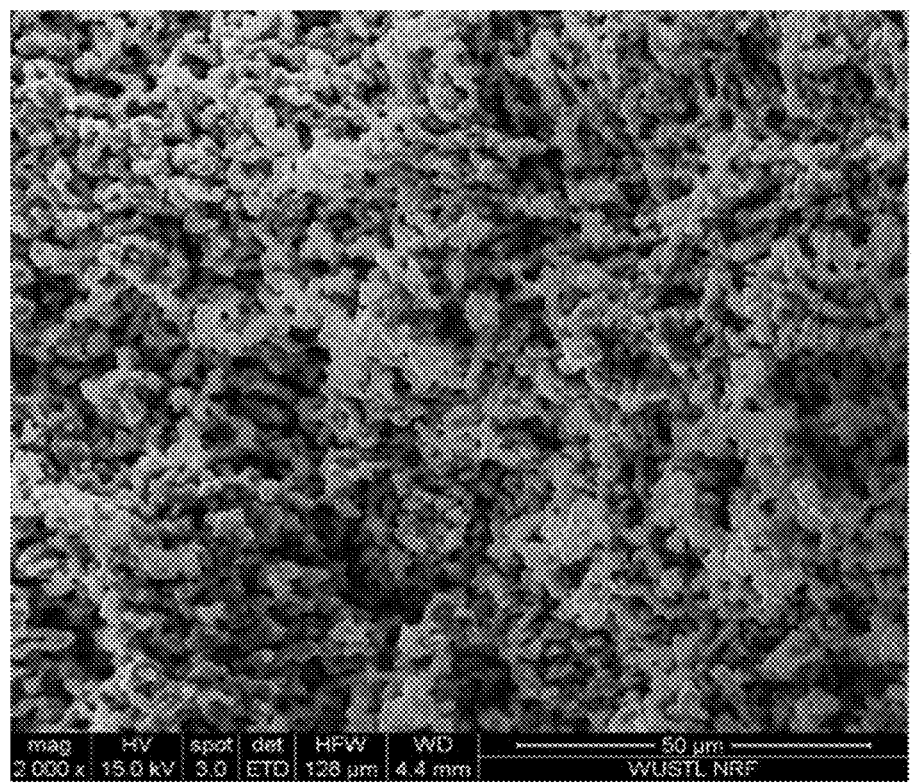
Figure 4:
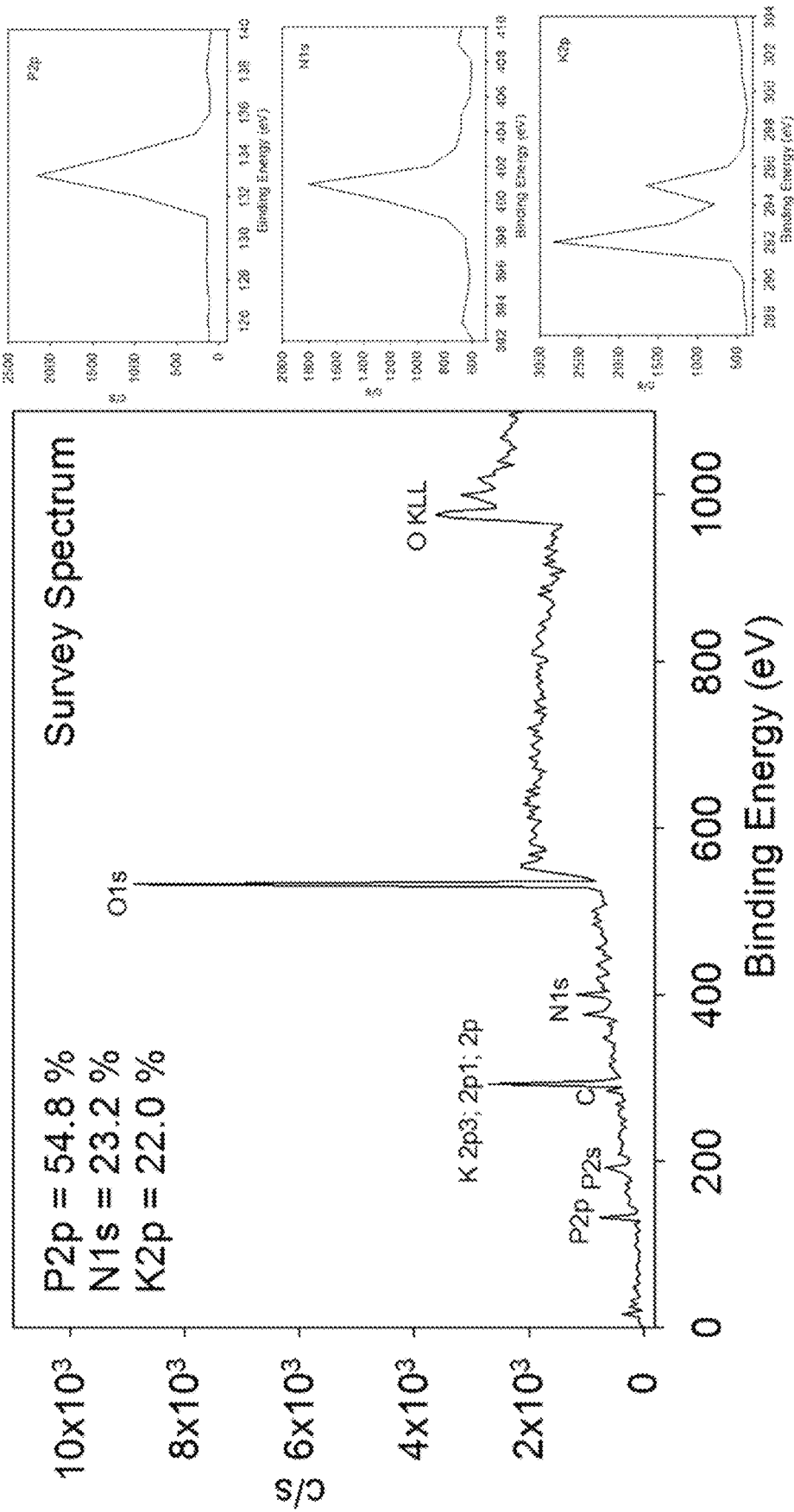
FIG. 4 depicts XPS characterization of NPK nanocomposite powder. The survey scan spectra (left) shows the presence of NPK. The P fraction was highest (54.8%) followed by N (23.2%) and K (22%). In the right, high XPS spectra of NP and K.
Figure 5:
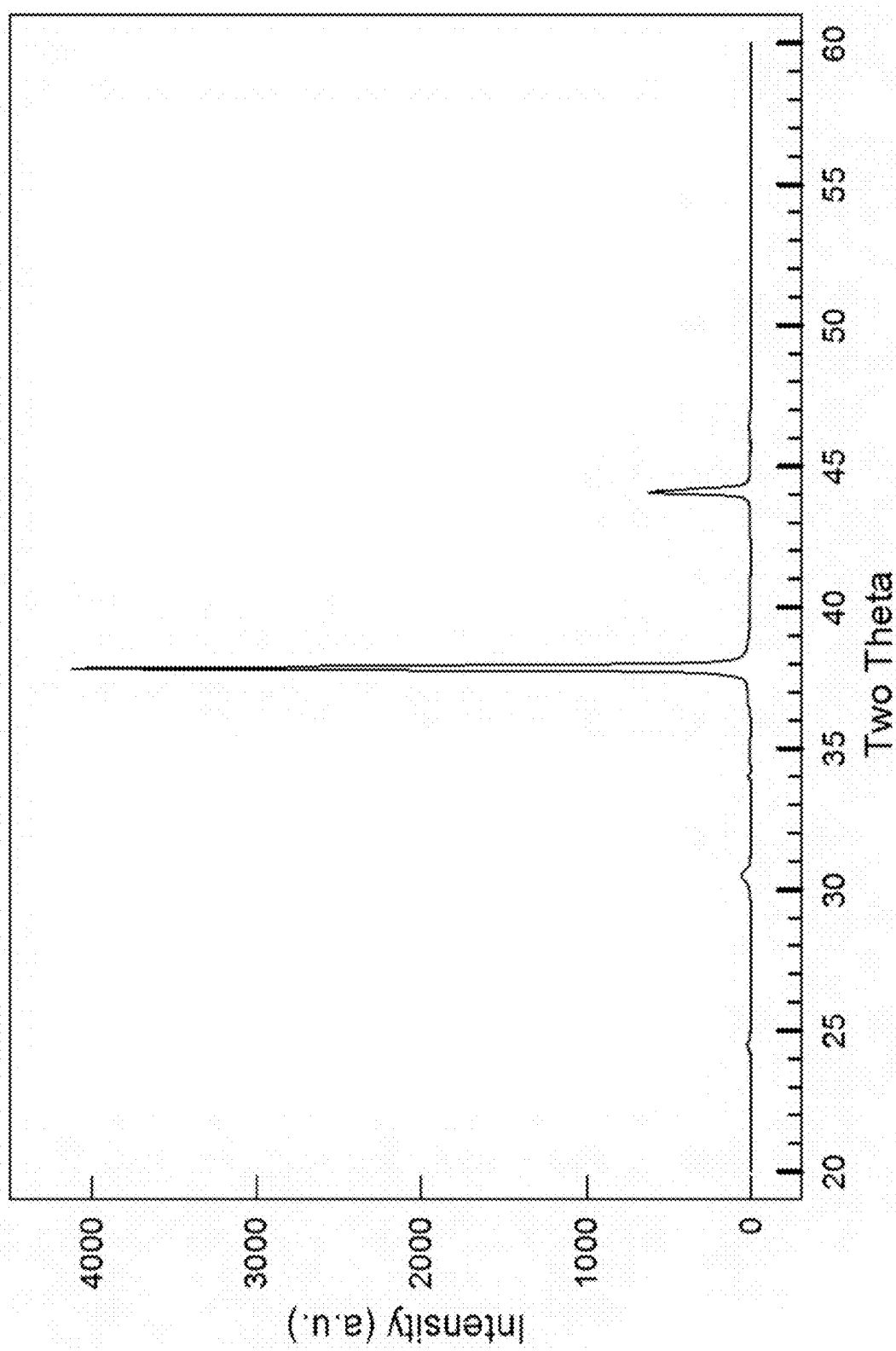
FIG. 5 depicts XRD characterization of powdered thin film prepared by NPK nanocomposite, synthesized by FuAR.

Synthesized NPK composite was characterized for morphology, chemical composition and crystal phase analyses. Transmission Electron Microscope (FIG. 2), Scanning Electron Microscope (FIG. 3), X-Ray photocorrelation Spectroscopy, XPOS (FIG. 4) and X-Ray Diffraction technique (FIG. 5) was used to characterize and analyze the NPK nanocomposite. FIG. 2 shows that the synthesized particles are able to dissolve rapidly in water. Rapid dissolution helps plants to uptake particles by the leaf surface. XPS characterization of the NPK nanocomposite powder showed that the P fraction was highest (54.8%) followed by N (23.2%) and K (22%) (FIG. 4).

Example 2. Preparation of a Formulation Using NPK Nanocomposite, ZnO and $TiO_2$ Nanoparticles and Effect of $^{PR}$Active Plant Food on Plant Growth and Development ZnO nanoparticle of Zincite crystal phase and $TiO_2$ nanoparticles of anatase crystal phase were synthesized using sol-gel synthesis approach. The synthesized nanoparticles were approximately 25 nm. The nanoparticles were mixed with NPK nanocomposite synthesized using a furnace aerosol reactor. The concentration of ZnO and $TiO_2$ was less than 10 mg/kg (v/w).

Figure 6:
FIG. 6 depicts *Lactuca sativa* plants after 21 days. Control where conventional fertilizer was applied and $^{PR}$Active Plant Food in which NPK nanocomposite along with ZnO and $TiO_2$ nanoparticles based formulation was used.

Systematic investigation of NPK nanocomposite and its impact on Lettuce *sativa* up to first trophic level was conducted. Improved NPK fertilizer was applied to 14 day-old *Lactuca sativa* (Red Lettuce) plants. A separate experiment was also carried out by making a nanonutrient formulation, $^{PR}$Active Plant Food (laboratory designation name) with the combination of nanoparticles of ZnO and $TiO_2$ (Raliya et al, 2016; Raliya et al, 2015). Results are very encouraging for the plant growth (so far up to 21 days, 7 days after) and clear differences in the plants growth can be observed visually (FIG. 6).

Figure 7:
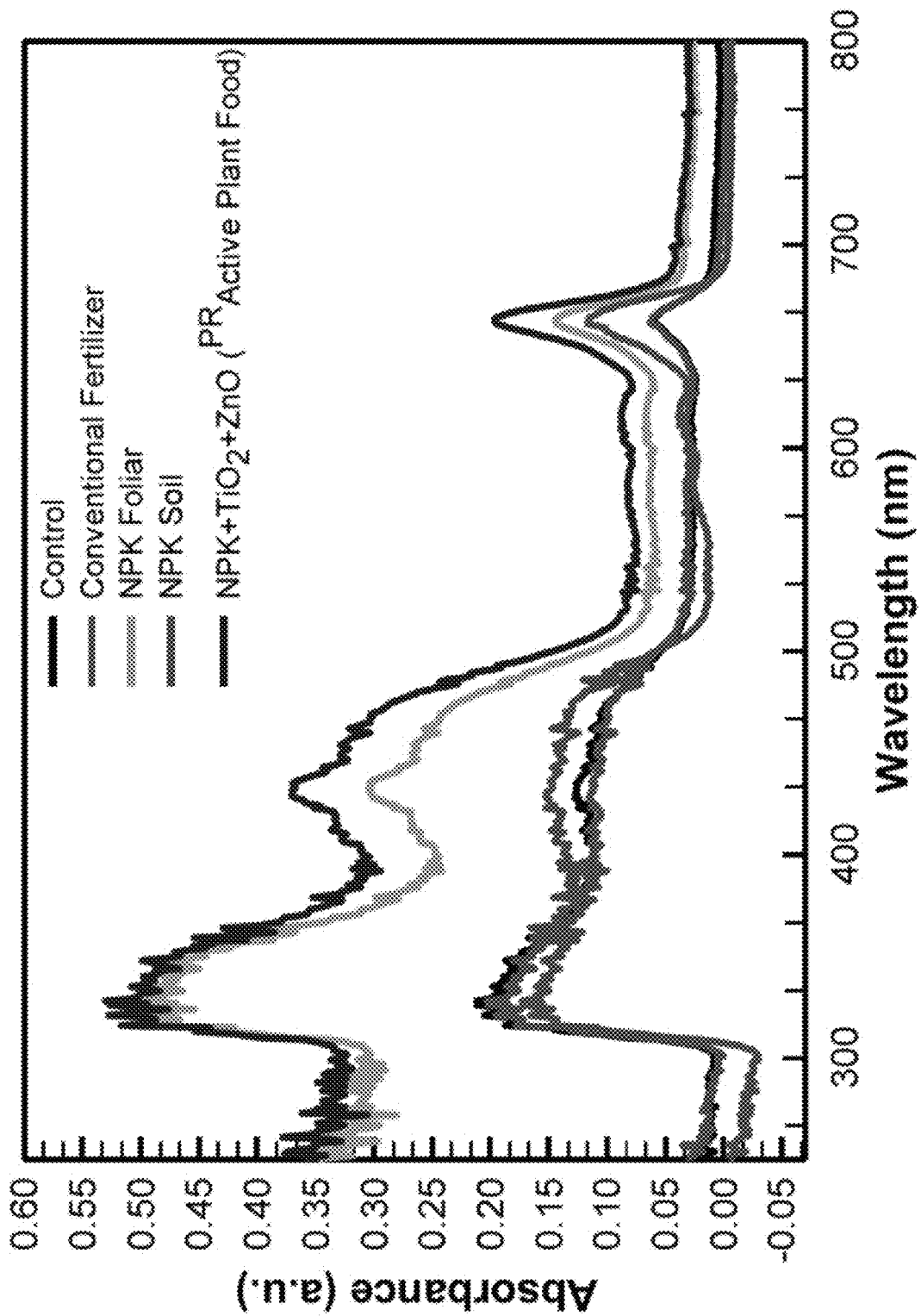
FIG. 7 depicts a graph showing light absorption by the leaves of lettuce.

The effect of the improved fertilizer on light absorption by plant leaves was evaluated. Conventional fertilizer was applied at 2700 mg/kg; $^{PR}$Active Plant Food has a Zn and Ti concentration of <10 mg/kg and 100 mg/kg of NPK nanocomposite. To understand the effect of various fertilizer treatments on the light absorption, leaf pigment was extracted in acetone and light absorption in the spectrum range of 250 nm to 1000 nm that covers UV, visible and near infrared radiations was analyzed. Light absorption with NPK foliar application and $^{PR}$Active Plant Food was increased several fold relative to the conventional fertilizer treated and control group (FIG. 7). Accordingly, improved fertilizer enhances photosynthetically active radiation by plant leaves at 21 days.

Figure 8A:
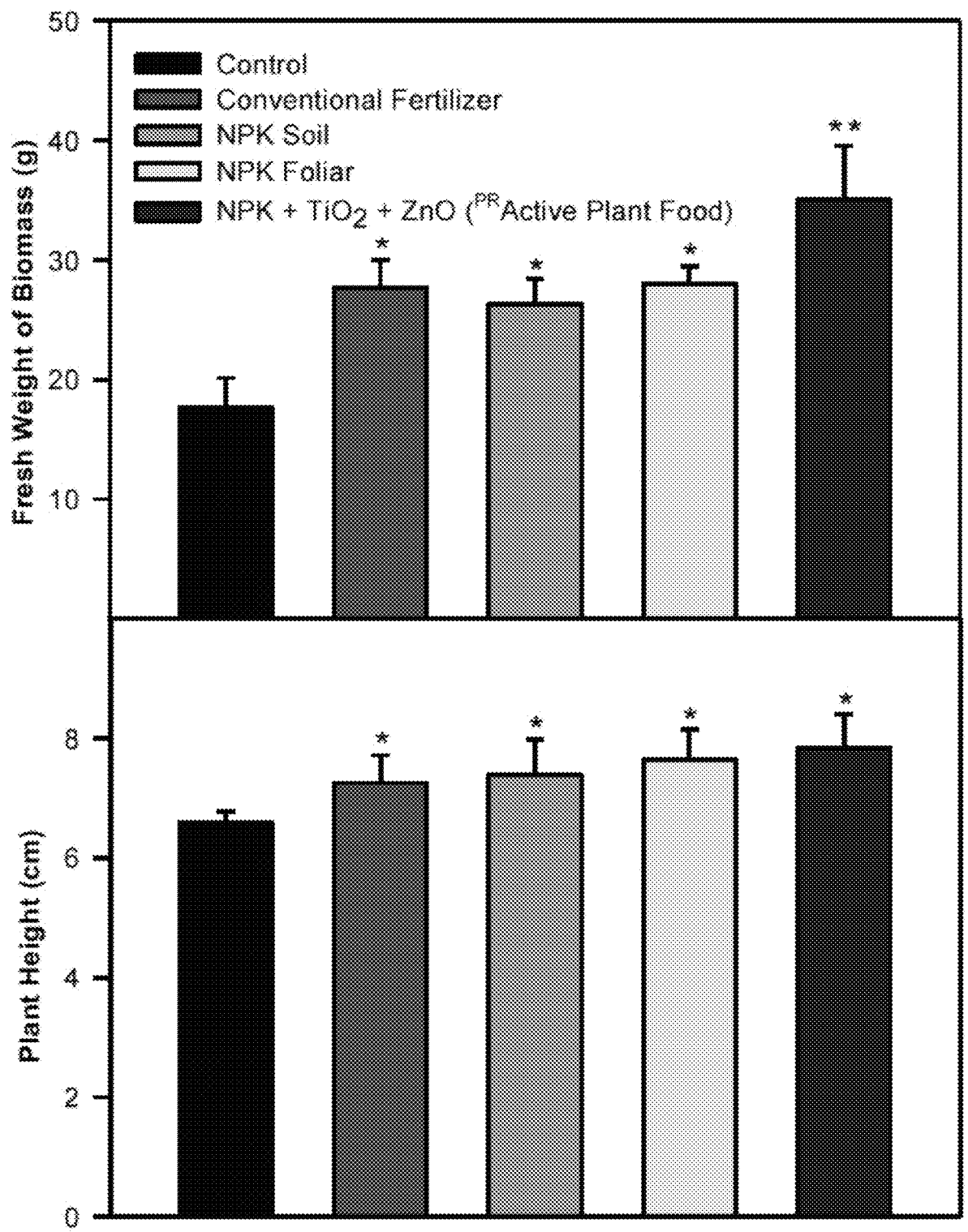
FIG. 8A and FIG. 8B depict the effect of improved fertilizer on lettuce physiological growth and development.
Figure 8B:

The effect of the improved fertilizer on biomass was evaluated. FIG. 8 shows lettuce plants harvested after 14 days of the treatment. The improved fertilizer combination (NPK+$TiO_2$+ZnO) significantly enhanced plant biomass with respect to control and other treatments. The improved fertilizer enhanced fresh biomass by 98% over control and 26% over conventional fertilizer. However, it should be noted that conventional fertilizer contains about 27 times more nutrients than the nanoparticles. Similarly, there is an improvement in fresh weight of plant biomass relative to control. FIG. 8 shows data from lettuce plants harvested after 14 days of the treatment or 28 day-old plants grown in the green-house.

Figure 9:
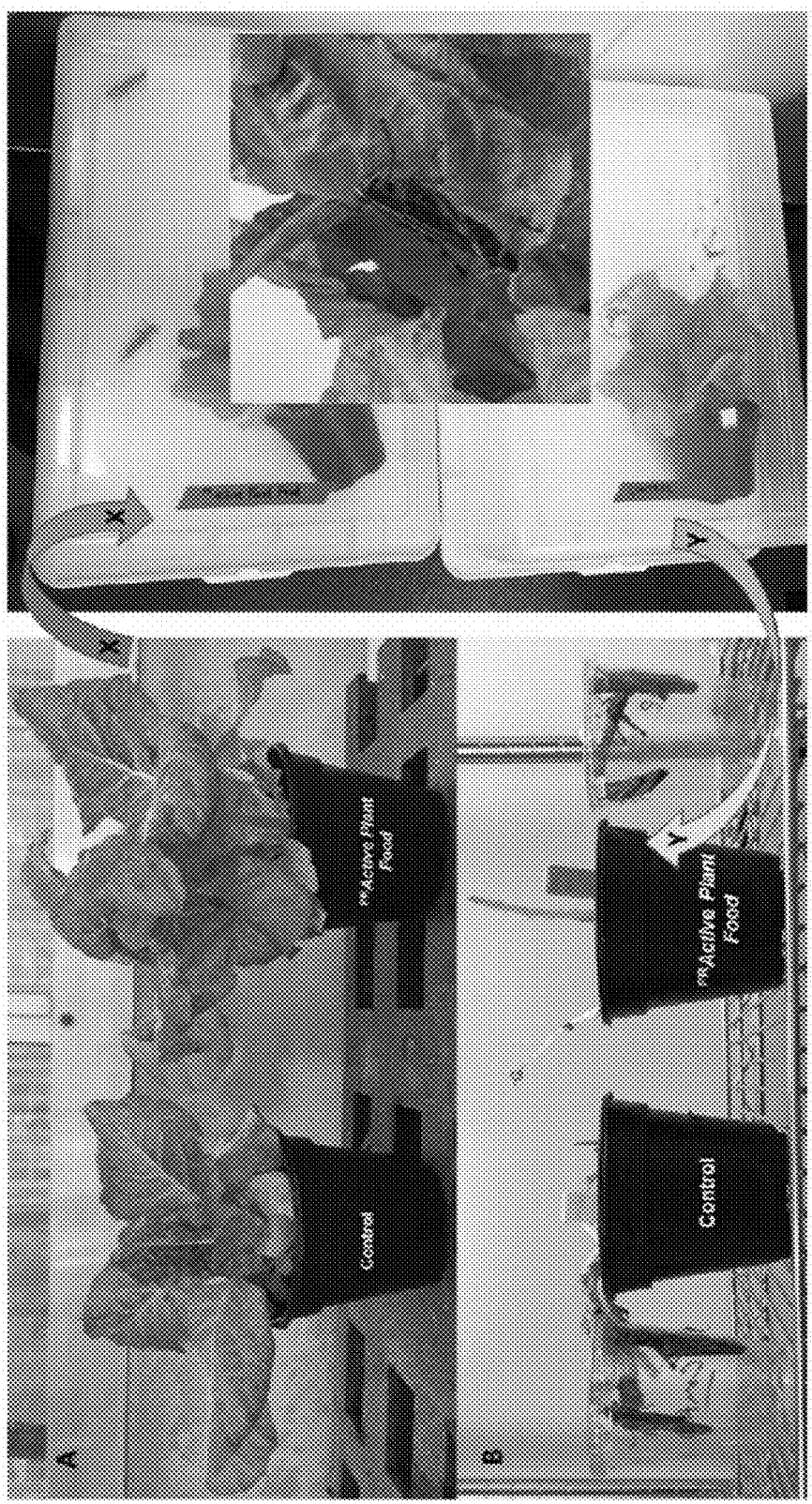
FIG. 9 depicts images following the investigation of beneficial (or harmful) impact of improved fertilizer treated plants' food on the first trophic level of the food chain.

Next, metal accumulation and toxicology were evaluated. Healthy plants (28 days old, FIG. 9A) were harvested from the greenhouse and locusts were allowed to eat the plants (direct consumption) for approximately 3 days (inset shows a locust eating the leaf). It was observed that plants' leaf part was almost completely consumed by the locust (FIG. 9B). During the course of food consumption, locust behavior was monitored continuously. No abnormal behavior was noticed and all the locusts remained healthy and normal. The locusts, remaining plant parts and soil were collected for further elemental analyses. Quantitative analyses of the locust (first trophic level) suggest that there is an increase in P, K, and Ti whereas a decrease in Zn (Table 1).

TABLE 1

ICP MS analyses of the locusts that consumed nanoparticles exposed food.

| Sample | P | K | Ti | Zn |
| --- | --- | --- | --- | --- |
| Control - Insect | 1865.16 | 3480.10 | 18.45 | 54.10 |
| $^{PR}$Active Plant Food - Insect | 2028.87 | 4305.88 | 20.14 | 46.58 |
| $^{PR}$Active Plant Food - Plant | 1873.26 | 4305.49 | 18.89 | 46.38 |

Introduction to Example 3.

The application of nanotechnology in the area of plant sciences has been extensively studied in recent years (Peng et al., 2012, Chen et al., 2014). A key aspect of the work of plant nutritional scientists is towards the precise delivery of nutrients and enhanced nutrient uptake. Chemical fertilizer uptake efficiency in plants is low due to fixation of nutrients with other soil composites or run off due to precipitation leading to a growing anthropogenic eutrophication issue (Smith et al., 1999, Hautier et al., 2014). To address these challenges, nanoparticles have been researched for use as insecticides (Wibowo et al., 2014), fungicides (Becker et al., 2010, Capaldi Arruda et al., 2015, Saharan et al., 2015) and nanofertilizers (DeRosa et al., 2010, Raliya and Tarafdar 2013, Liu and Lal 2014, Raliya et al., 2014, Tarafdar et al., 2014, Liu and Lal 2015, Raliya et al., 2016). While there has been a significant push to engineer beneficial nanoparticles, there are also unintentional exposures and releases of nanoparticles from various industries that may end up in the ecosystem (Biswas and Wu 2005, Yang et al., 2014).

Inductively coupled plasma-mass spectroscopy (ICP-MS) or inductively coupled plasma-optical emission spectroscopy (ICP-OES) are powerful tools to analyze metal accumulation in plants. In both the techniques, the entire plant tissue digested in the acid mixture before analysis. ICP-MS is preferred for nanoparticle detection in biological samples, due its detection sensitivity (Scheffer et al., 2008). During ICP-MS analysis, digested samples are introduced into argon plasma as aerosol droplets. The droplets dry in the plasma region, dissociate into the molecular constituents, and then form singly-charged ions, which are directed to a filtering device known as the mass spectrometer.

In the present study, gold nanoparticles (Au NPs) were used due to their biologically inert properties and their past utilization in genetic engineering through adsorbtion of DNA on a gold particle surface which can be delivered to cells (Ghosh et al., 2008, Thakor et al., 2011). Au NPs have shown great promise in the facile, on-site detection of contagious plant viruses when applied to a strip sensor (Zhao et al., 2011, Wei et al., 2014). These nanoparticles can be functionalized to target specific sites within an organism's cellular substructure, and could allow genetic modifications to be made from within the plant itself, rather than through a traditional in-vitro process. Moreover, if dispersed throughout a plant, Au NPs may eventually prove useful for real-time plant disease detection. Nonetheless, it is essential to understand the fundamental mechanisms of morphology-dependent cellular uptake of gold nanoparticles, as well as their transport and subsequent fate in a plant system.

In this work, we describe the effects of gold nanostructure on their internalization, translocation and accumulation in the watermelon plant. Au NPs of various sizes and morphologies were synthesized, characterized, and applied to the plants in aqueous suspension via foliar (drop-cast and aerosol) application. The objectives of this study were (1) to optimize nanoparticle delivery in plants comparing conventional drop cast approach v/s aerosol technique (2) to understand the uptake, transport and accumulation of nanoparticles in correlation to nanoparticle morphology and (3) to develop an alternative approach to nanoparticle quantification in plant tissue using ICP-MS. Au NPs were chosen as a representative of metallic nanoparticles because of its broad application and ease to tune particle morphology. Watermelon plant (Citrullus lanatus) was chosen because of its popularity as an edible fruit around the world, and also because it has leaves with both large stomata and vessel size, which may facilitate nanoparticle uptake and translocation.

Methods for Example 3.

The experimental plan of the study is summarized in Table 2, and details of the same are described in the following sections.

Gold Nanoparticle Synthesis and Characterization.

Reagents.

Ascorbic acid (99.8%) was procured from J. T. Baker. Hexadecyltrimethyl ammonium chloride (≥95.0%) was purchased from Tokyo Chemical Industry Co, Ltd. sodium borohydride (≥99%), hexadecyltrimethyl ammonium bromide (≥99.0%), sodium bromide (≥99.0%), silver nitrate (≥99.9999%), gold (III) chloride trihydrate (≥99.9%), and gold chloride solution (200 mg/dL) were purchased from Sigma-Aldrich. All chemicals were used as received.

Synthesis.

Gold nanoparticles of spherical, cubic, rhombic dodecahedral (RD), and rod morphologies were prepared using seed-mediated methods (Becker et al., 2010, Wu et al., 2010). Gold seeds (2-3 nm) were produced through the reaction of gold chloride with the reductant, ascorbic acid. Formation of gold seed particles was evident due to the immediate brown color formation upon addition of catalyst, sodium borohydride. Au NPs formation occurs as a result of the nucleation of gold seeds in growth solutions, varying the amount of gold seeds and concentration of reducing agent.
Characterization.

Synthesized nanoparticles were characterized for their morphological properties prior to their application to the watermelon plants.
Transmission Electron Microscopy (TEM).

Nanoparticle samples were prepared for TEM characterization by placing a drop of aqueous particle suspension on a carbon-coated copper grid and allowing the sample to air-dry. TEM images were viewed and obtained with the aid of a Tecnai $G^2$ Spirit transmission electron microscope (FEI, USA).

UV-Visible (UV-Vis) Spectrophotometry.

Nanoparticle samples were diluted 2× with deionized (DI) water for UV-Visible spectrophotometry analyses. Surface plasmon resonance of each sample was determined using a Varian Cary 50 UV-visible spectrophotometer (Varian, Inc., USA), measuring the absorbance of light with wavelengths in the 400-1000 nm range at medium sample speed. The maximum peak in each absorbance band was taken to be the surface plasmon resonance of the sample.
Dynamic Light Scattering (DLS).

Samples were prepared for DLS characterization by diluting 2× with DI water. Using DLS, hydrodynamic size and zeta potential measurements were performed using a Malvern Zeta Sizer Nano ZS (Malvern Instruments, USA). Samples were equilibrated for 2 min at 25° C. before obtaining each measurement. All the measurements were performed in triplicate.
Inductively-Coupled Mass Spectrometry (ICP-MS).

To determine the nanoparticle concentration in suspension, 100 μL of each nanoparticle solution was digested in 400 μL aqua regia (Nitric acid:hydrochloric acid, 3:1). Digested samples were diluted with 4.5 mL 1% nitric acid. Elemental concentration of gold in each sample was measured with the aid of an ELAN DRC II ICP-MS (Perkin Elmer, Inc., USA). The concentrations of spheres, cubes, RD, and rods (in ppm) were $2.29 \times 10^3$, $1.12 \times 10^4$, $1.18 \times 10^4$, and $1.44 \times 10^3$, respectively (Table 3). These concentrations were further diluted before the use of these particles for plant exposure.
Watermelon Plants and Growth Conditions.

All plants were grown in a controlled environment chamber with a constant temperature of 34±2° C., 60±2% relative humidity, constant air flow, a photoperiod of 16:8 hours and a photosynthetic photon flux density of 750 μmol m$^{-2}$ s$^{-1}$. Black Diamond watermelon (*Citrullus lanatus*) seeds were grown in plastic pots (38 mm square) filled with moisture control potting mix (Miracle-Gro Lawn Products, USA). One seed was planted in each pot. Soil was kept moist and pots were covered until seed germination. Upon germination, pot covers were removed and seedlings were given 10 ml deionized water daily. In addition, 5 mL of nutrient solution mixture (Miracle Grow, USA) was also supplied on every alternate day.
Exposure of Nanoparticles to Plant.

Each nanoparticle sample was diluted with DI water to 100 ppm for spraying. To prepare watermelon plants for spraying, all leaves were left intact, but one was removed to function as a control. Experiments were performed in triplicate for each type of particle and each application method, and four plants, each of 14 days old were used for control, on which only DI water was applied. All the exposure experiments were conducted in between 11 am and 1 pm to ensure stomatal opening.
Aerosol Method.

Figure 10:
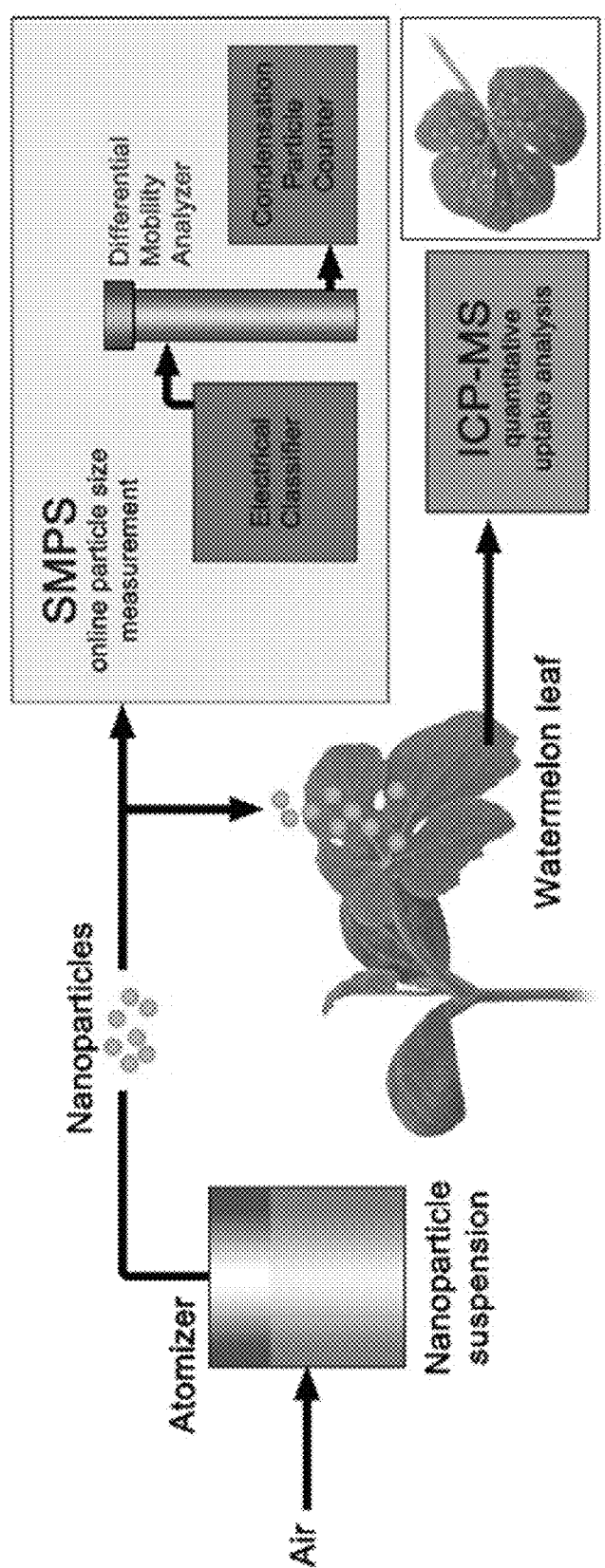
FIG. 10 depicts a schematic of an aerosol method for nanoparticle delivery and quantification of nanoparticle uptake, accumulation, and translocation in watermelon. The bottom right image represents the drop caste method of nanoparticle delivery to leaf using auto-pipette.

A schematic of the atomizer application method is provided in FIG. 10A. The soil of the plants was covered so that no particles could be sprayed directly onto the soil. The surface of each plant's remaining mature leaf was sprayed for 10 min in a fume hood. Gold nanoparticles were aerosolized by a TSI atomizer under 30 psi flowing air. During exposure, online measurements of the applied particle size and number concentration were monitored by Scanning Mobility Particle Sizer (SMPS, TSI, Inc., USA).
Drop-Cast Method.

To compare the nanoparticle uptake with respect to aerosol application, an equal amount of each sample was placed in small droplets using auto-pipette on the surface of a plant's mature leaf. Plants were left undisturbed after applying particles, allowing the droplets to air dry. An image of a leaf after treatment by the drop-cast method is provided in FIG. 10B.
Nanoparticle Uptake, Transport and Accumulation Analysis Using ICP-MS.

After nanoparticle exposure to plants either by an aerosol or drop cast method, plants were allowed to grow for 48 hours in the environmental condition described above. This allowed accumulation of the nanoparticles as they were transported and interacted with plant cells and tissues.
Harvest Plants.

Plants were harvested 48 hours after applying the nanoparticles. To prepare plant samples for uptake analysis, roots were first washed with tap water to remove the adhered soil. The entire plant was then rinsed with DI water three times. Roots, stems, seed leaves, and sprayed leaves of each plant were separated into 20 ml glass vials. The harvested samples were placed in a drying oven at 60° C. until the dry matter reached a constant weight.
Elemental Analysis.

After all, samples had dried for 60-72 hours at 60° C., each sample was crushed into a fine powder. Powdered samples (100 mg) were digested in 6 mL aqua regia (HNO3 and HCl) at 150° C. using microwave digestion (CEM MARS 6 Xpress, CEM Corp., USA). After complete digestion, each sample was suspended in 5 mL DI water and filtered through a 25 mm syringe filter with a 0.45 μm nylon membrane (VWR Inc., USA). These filtered samples were analyzed with the aid of an ELAN DRC II ICP-MS (Perkin Elmer, Inc., USA) to determine the concentration of elemental gold in each plant section. Based on the raw data of elemental detection intensity, nanoparticles uptake and accumulation were calculated. All the sample measurements were performed in triplicate, and statistical analysis was performed using Microsoft Excel V.2013 software.

Figure 11A:
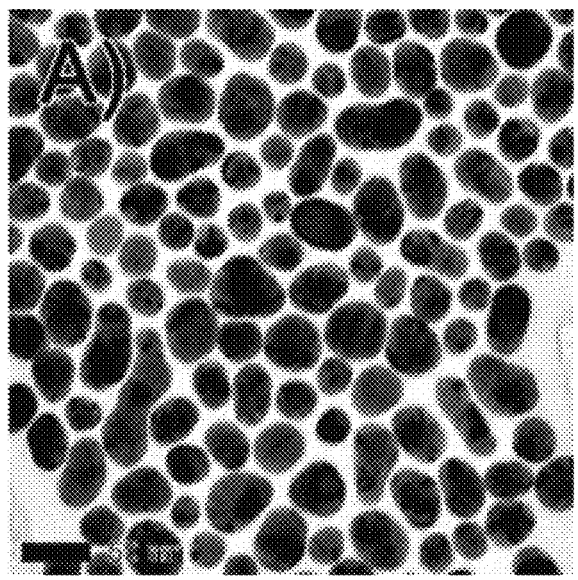
FIG. 11A, FIG. 11B, FIG. 11C, FIG. 11D, FIG. 11E and FIG. 11F depict characterization of gold nanoparticles. TEM images of gold nanostructure (FIG. 11A) spheres, (FIG. 11B) truncated cubes, (FIG. 11C) rhombic dodecahedra, and (FIG. 11O) rods (FIG. 11E) UV-visible absorption spectra showing characteristic absorption for each nanostructure (FIG. 11F) Pictured from left (FIG. 11A) to right (FIG. 11D): nano-spheres, truncated cubes, rhombic dodecahedra, and rods as synthesized in aqueous suspension.
Figure 11B:
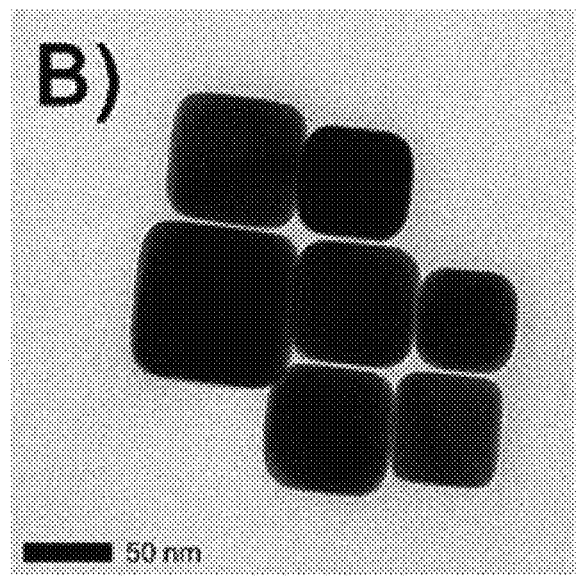
Figure 11C:
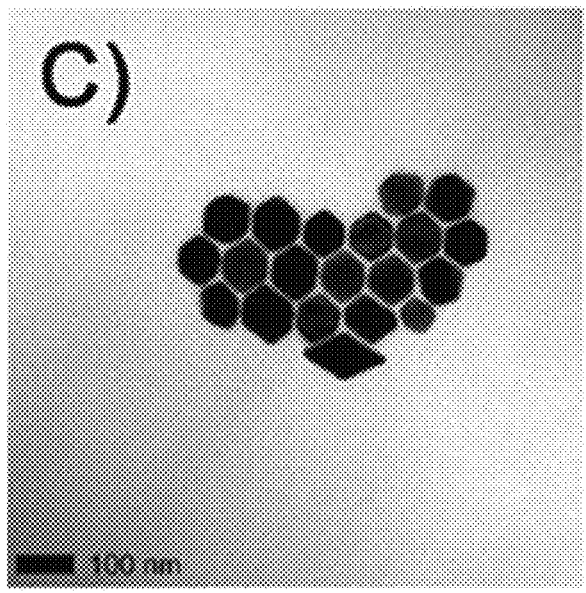
Figure 11D:
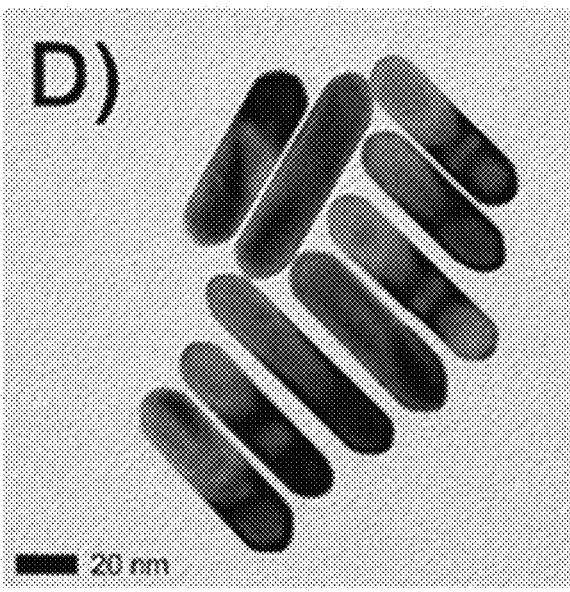
Figure 11E:
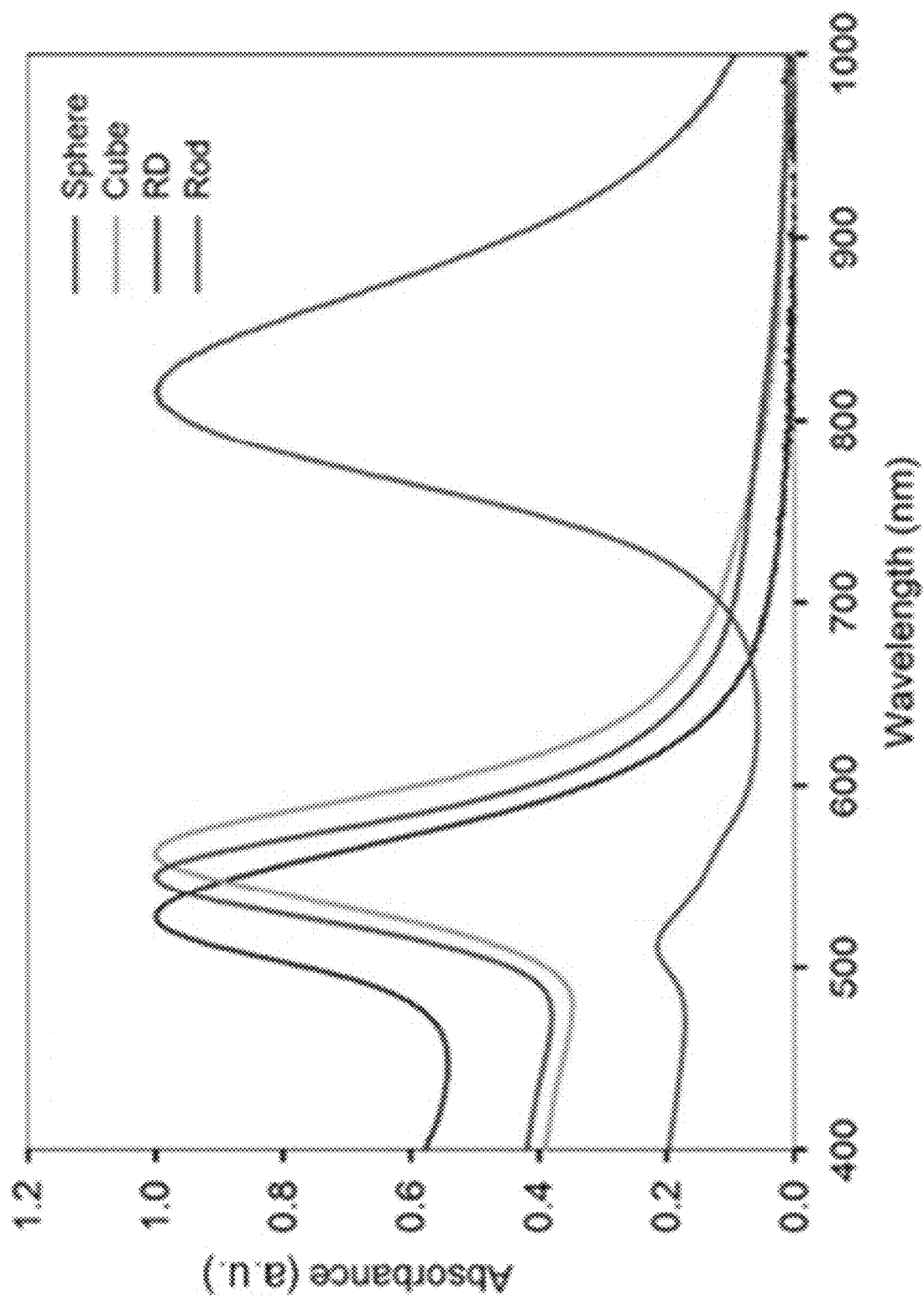
Figure 11F:
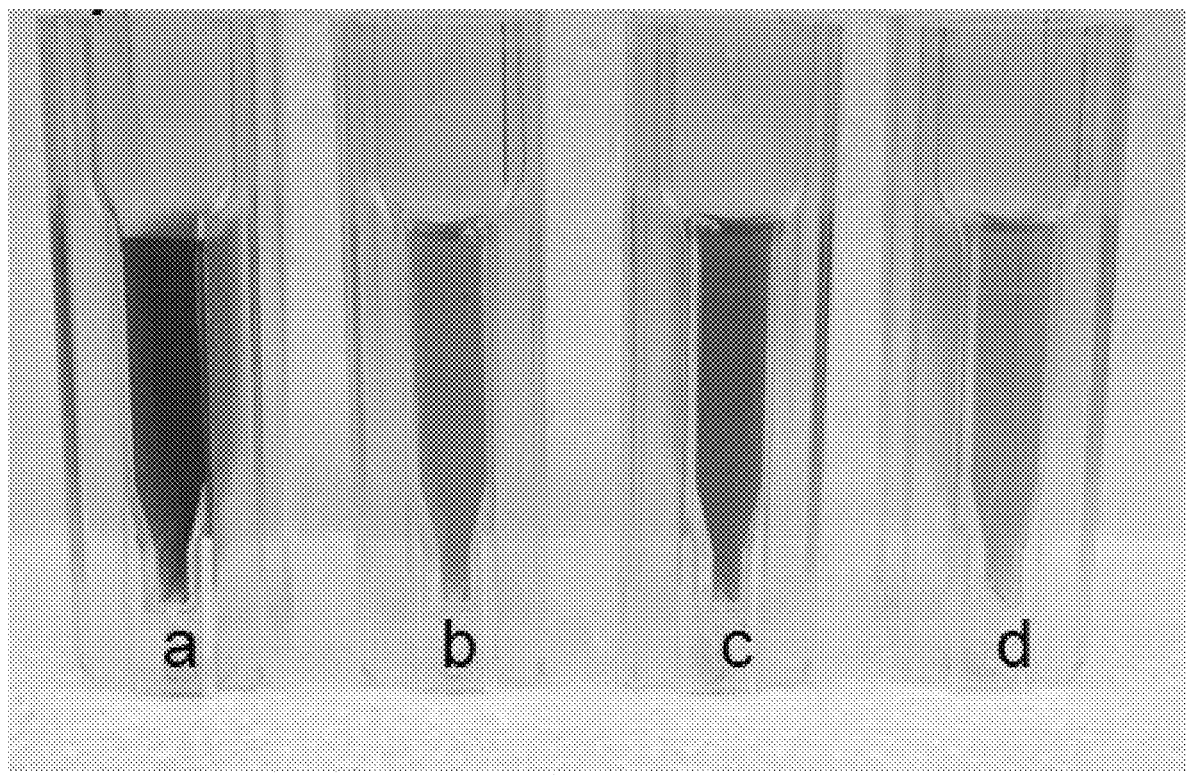

Example 3. Quantitative Understanding of Nanoparticle Uptake in Watermelon Plants The particle characterization results are presented first, followed by a description of their impact on the plants. As indicated in test plan 1 (Table 2), particle morphologies, surface chemistry, and geometric diameters were determined to study their uptake and transport by watermelon (FIG. 11A, FIG. 11B, FIG. 11C, and FIG. 11O). Mean geometric diameters of spherical, cubic, and rhombic dodecahedral particles were found to be 35, 70, 65 nm respectively (Table 3). Rod-shaped particles were 60 nm in length, 20 nm in diameter, and therefore with an aspect ratio of three (Table 3). The morphology and diameter of Au NPs were also evidenced by UV-Vis absorption spectra and specific color intensities of the solutions (FIG. 11E and FIG. 11F).

Figure 12A:
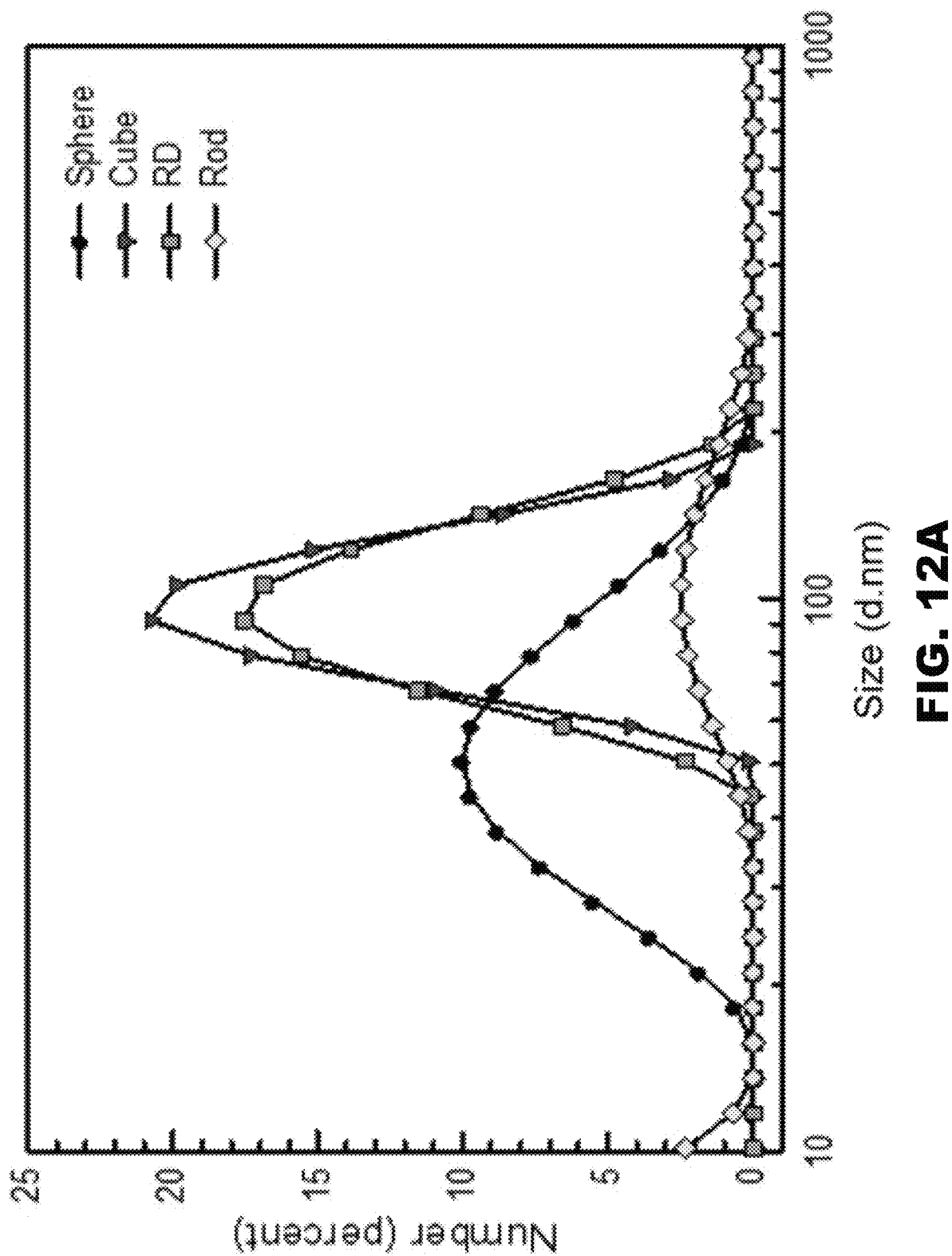
FIG. 12A and FIG. 12B depict online and offline size measurement of gold nanostructures.
Figure 12B:
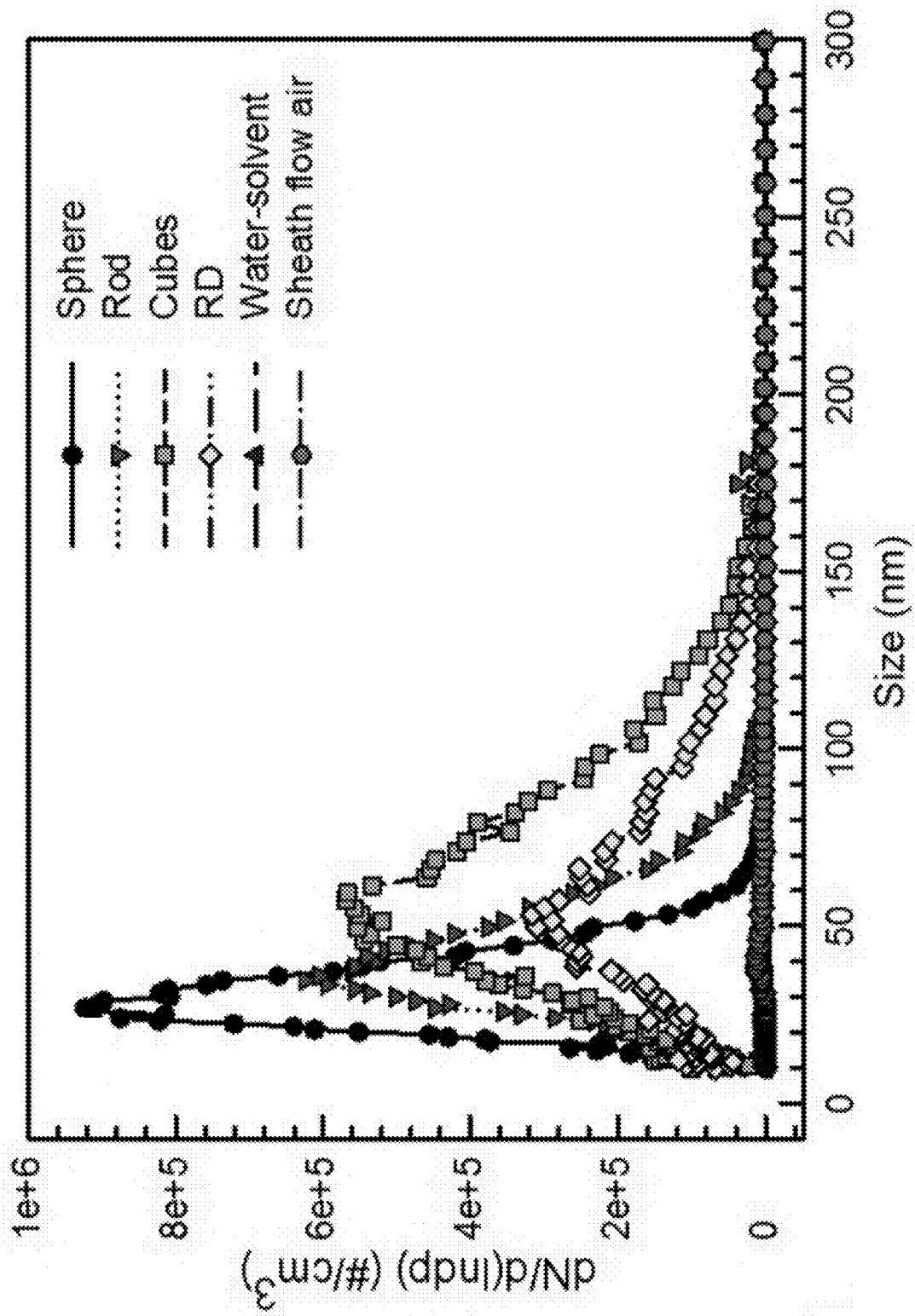

Hydrodynamic size and zeta potential values were measured by the offline tool, DLS, and are summarized in Table 3. Zeta potential of the nanoparticles were determined to be −40.5, 56.7, 64.3, and 43.9 mV for spheres, cubes, RD, and rods respectively. The hydrodynamic sizes of all particles were larger than the geometric mean diameters determined from TEM images. This size disparity is due to the soft agglomeration of nanoparticles due to Van der Waals forces (Wang et al., 2013). Therefore, by comparing these two foliar application methods, we optimized the effect of applied droplet size for maximum Au NPs uptake in plants. In order to precisely determine nanoparticle delivery, the size distribution of the gold nanoparticles were monitored in real time using a scanning mobility particle sizer (SMPS). Before each exposure, a background measurement of particle size distributions of air and DI water was carried out. The results (base lines in the FIG. 12B) show that DI water and air do not have any significant particle concentration or formation, thus implying a negligible effect on the aerosol size and number concentration measured by the SMPS. The SMPS measurements showed good agreement with the geometric mean diameter (GMD) observed by TEM (FIG. 12A and FIG. 12B). The observations indicate that shear forces in the atomizer during aerosolization resulted in the break up of Au NP agglomerates and the formation of singlet particles (Brandt et al., 1987).

The nanoparticle suspensions were aerosolized and delivered to the watermelon leaf surface. For comparison, a solution drop method was employed concurrently for all the sample material in equal exposure concentration and volume. After 48 hours all the samples were harvested and analyzed by ICP-MS to detect Au NPs concentration in leaves, stem and roots. The measured concentrations of elemental gold in each sample were normalized by the dried mass of the plant section, and this data was processed to determine the percent of recovered gold in each plant section.

Figure 13A:
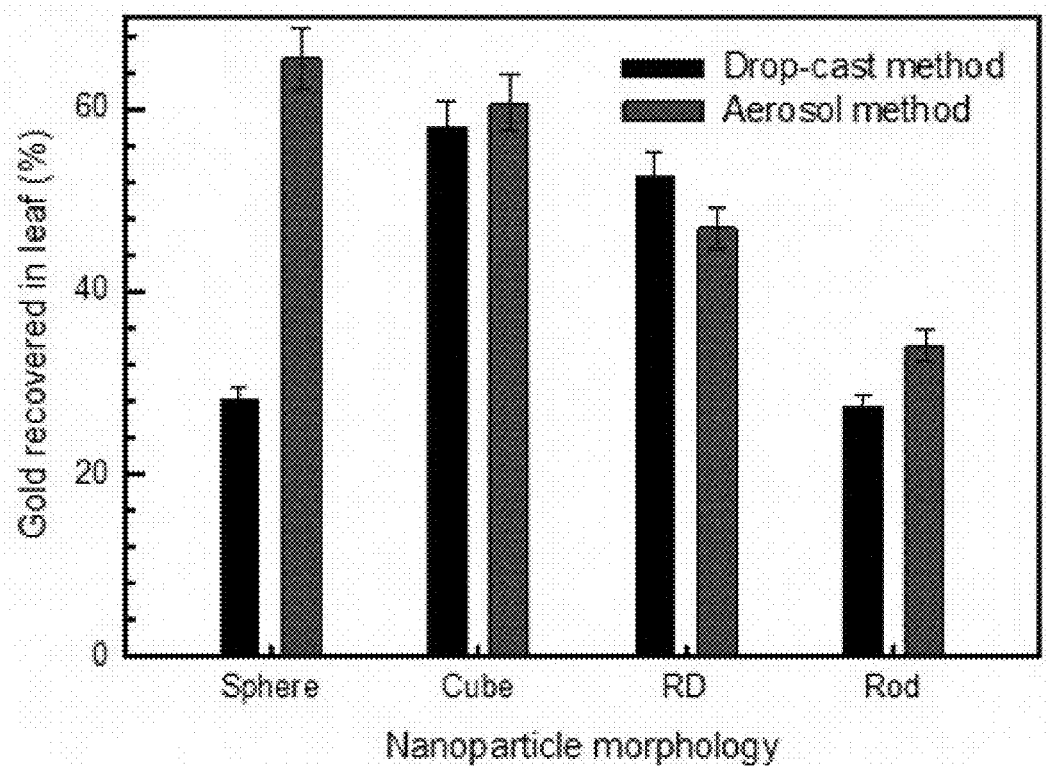
FIG. 13A, FIG. 13B and FIG. 13C depict gold nanoparticles accumulation in watermelon that was recovered by ICP-MS in (FIG. 13A) root, (FIG. 13B) shoot, and (FIG. 13C) root sections of treated plants, comparing results of drop-cast and aerosol method of nanoparticle delivery.
Figure 13B:
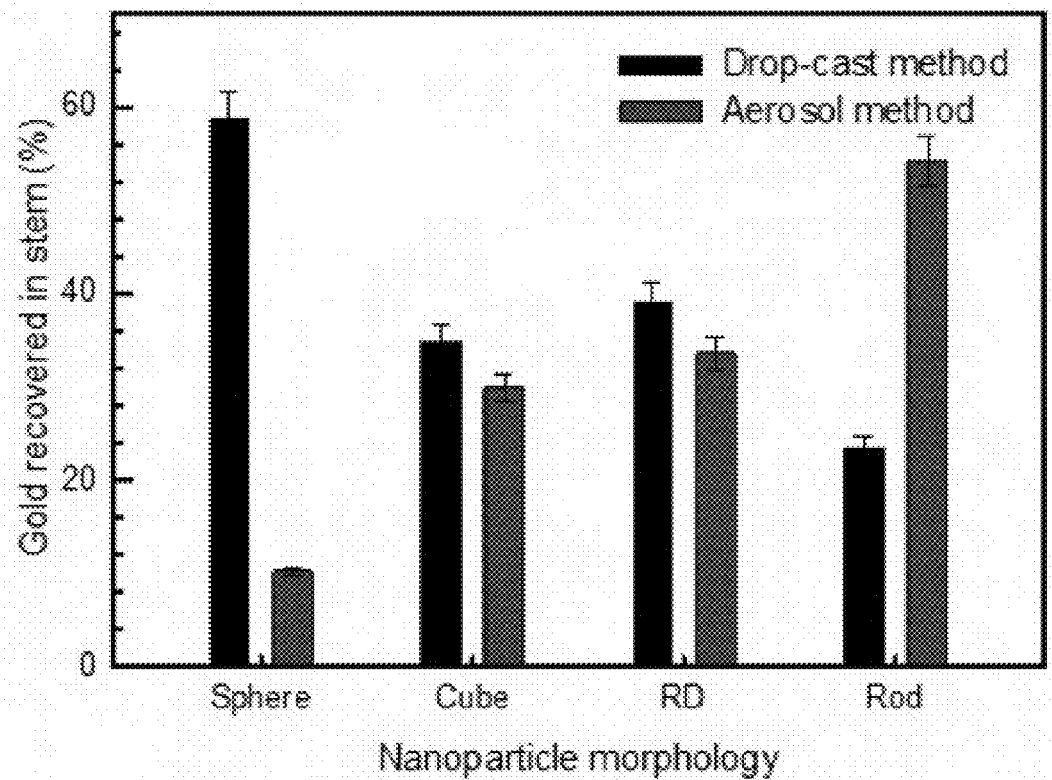
Figure 13C:
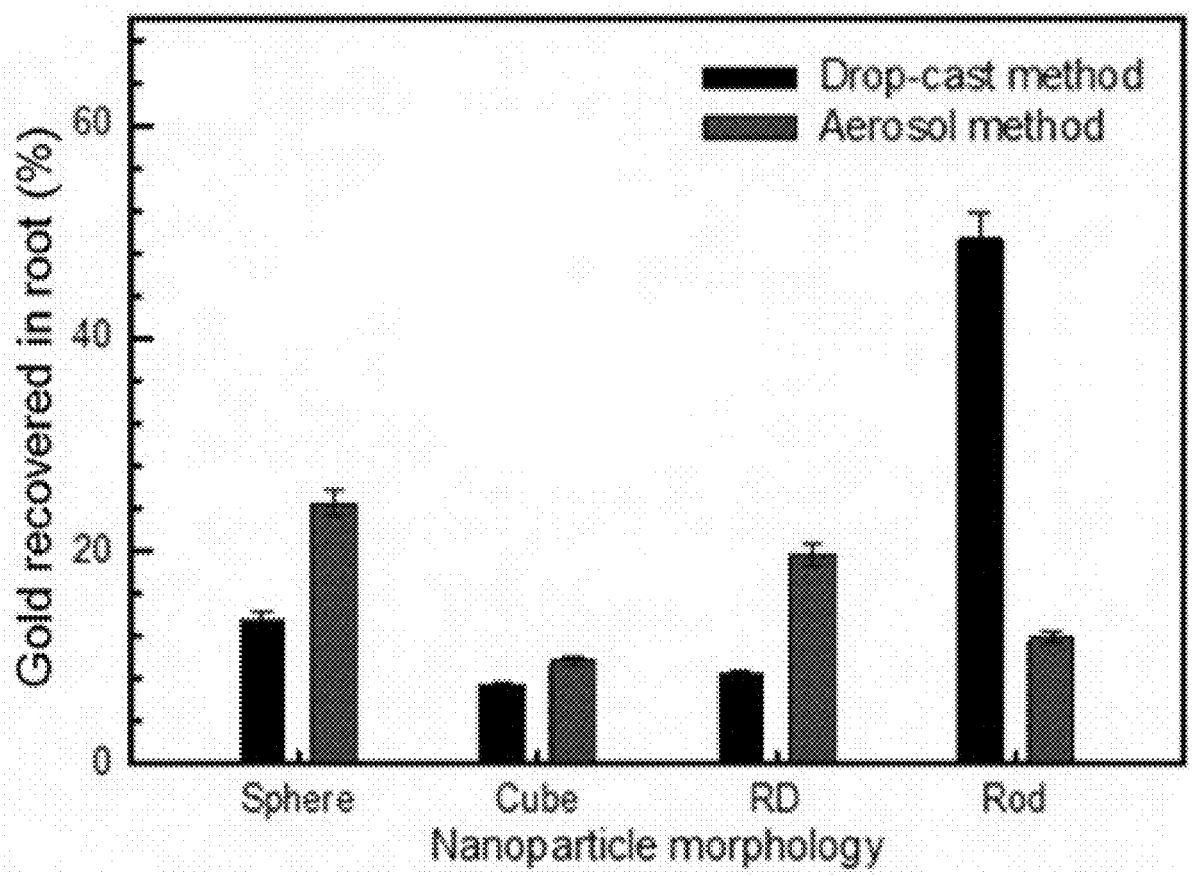

ICP-MS analyses suggest that, when applied by drop-cast method, 28.0% of spherical particles were accumulated in the leaf, followed by 58.6% recovered in the stem and 13.4% in the root (Table 4). Comparing the results of the two application methods, aerosol application of low aspect ratio particles (sphere, cube and rhombic dodecahedra) enhanced their transport, resulting in a greater percentage of gold being recovered in the root sections. For sphere, cube, and rhombic dodecahedral morphologies, the increase in translocation rate of the aerosolized versus drop-cast nanoparticles was 10.9, 2.3, and 11.3% respectively, whereas a 37.4% decrease in translocation rate was observed for the nanorods (Table 4). This trend suggests that the smaller droplet size delivered by the aerosol method increased translocation of low aspect ratio particles to the plant roots, but inhibited the translocation of higher aspect ratio nanoparticles. The opposite trend was observed for the larger droplet size delivered by the drop-cast method. When the nanoparticles were applied using the drop cast method, the rods, which had a higher aspect ratio than other morphologies tested, translocated to the roots to the greatest extent (49.2%) as compared to the translocation of spheres (13.4%), cubes (7.3%), and rhombic dodecahedra (8.3%) (FIG. 13A, FIG. 13B, and FIG. 13C). Thus the larger droplet size may improve the uptake and transport of high aspect ratio nanoparticles.

Figure 14A:
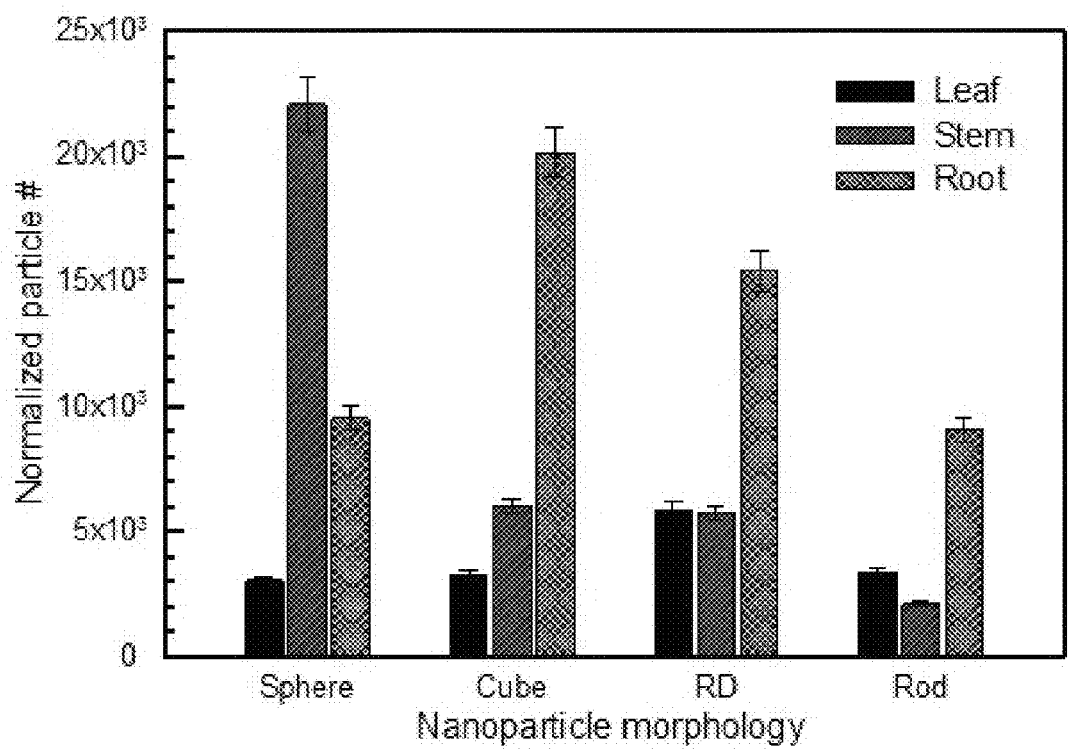
FIG. 14A and FIG. 14B depict transport and accumulation of gold nanoparticles.

Furthermore, trends comparing all nanoparticles were identified. For drop-cast application methods, a trend in the efficacy of translocation (percent of recovered gold accumulated in roots) was observed as: rod (49.3%)>sphere (13.4%)>RD (8.3%)>cube (7.3%), whereas, trend for aerosol route applied particles were cube (37.38%)>RD (28.03%)>sphere (17.76%) and rod (16.82%). The results of the aerosol application method were further processed, normalizing the acquired concentration of gold by the online measurement of number concentration of particles in order to account for any discrepancies in the number of particles applied. From these normalized results (FIG. 14A), a trend in the efficacy of translocation (number of particles recovered in root) was observed as: cube (20,000)>RD (15,000) >sphere (9500)>rod (9000), a trend which again suggests that the aerosol application method results in improved translocation of low aspect ratio particles. In this experiment, we did not see any recognizable stress responses in the treated plants, supporting our hypothesis that AuNP are nontoxic to plants due to their biologically inert state (Shukla et al., 2005). Notwithstanding, our procedure required only 48 hours of AuNP exposure; therefore, to further verify this hypothesis, extended toxicological studies must be conducted to determine the long-term effects of Au NPs on plants.

Figure 14B:
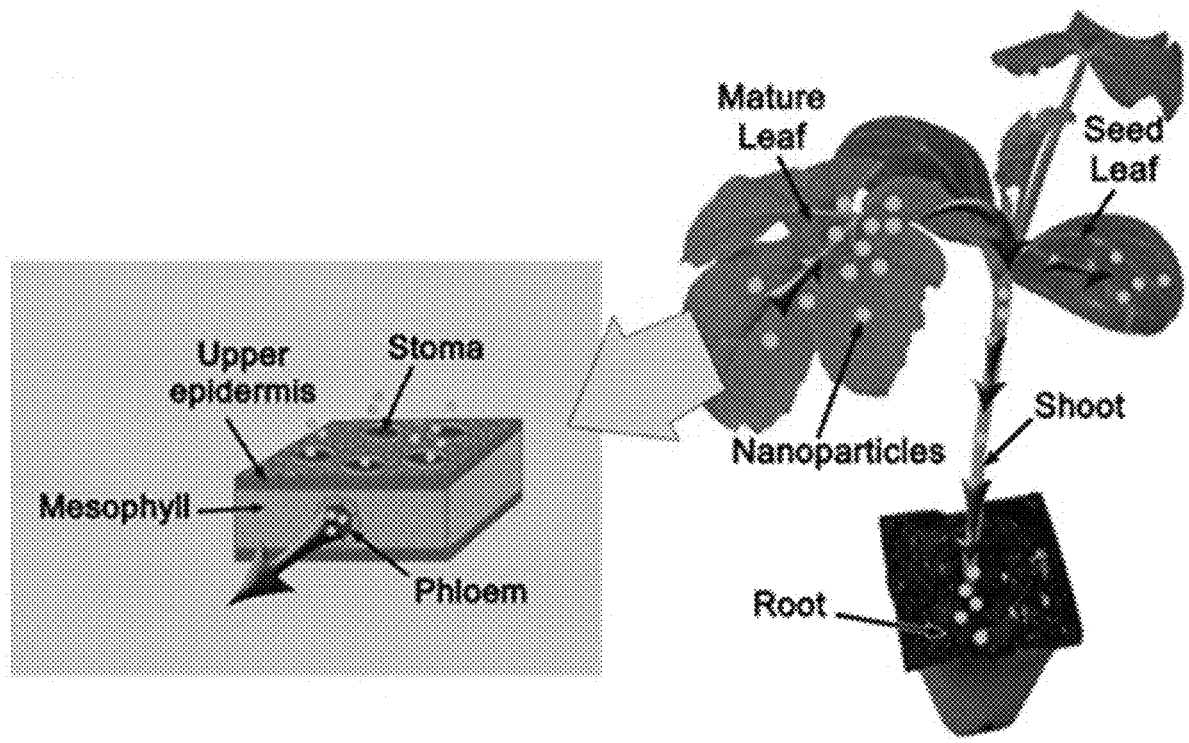
Figure 15:
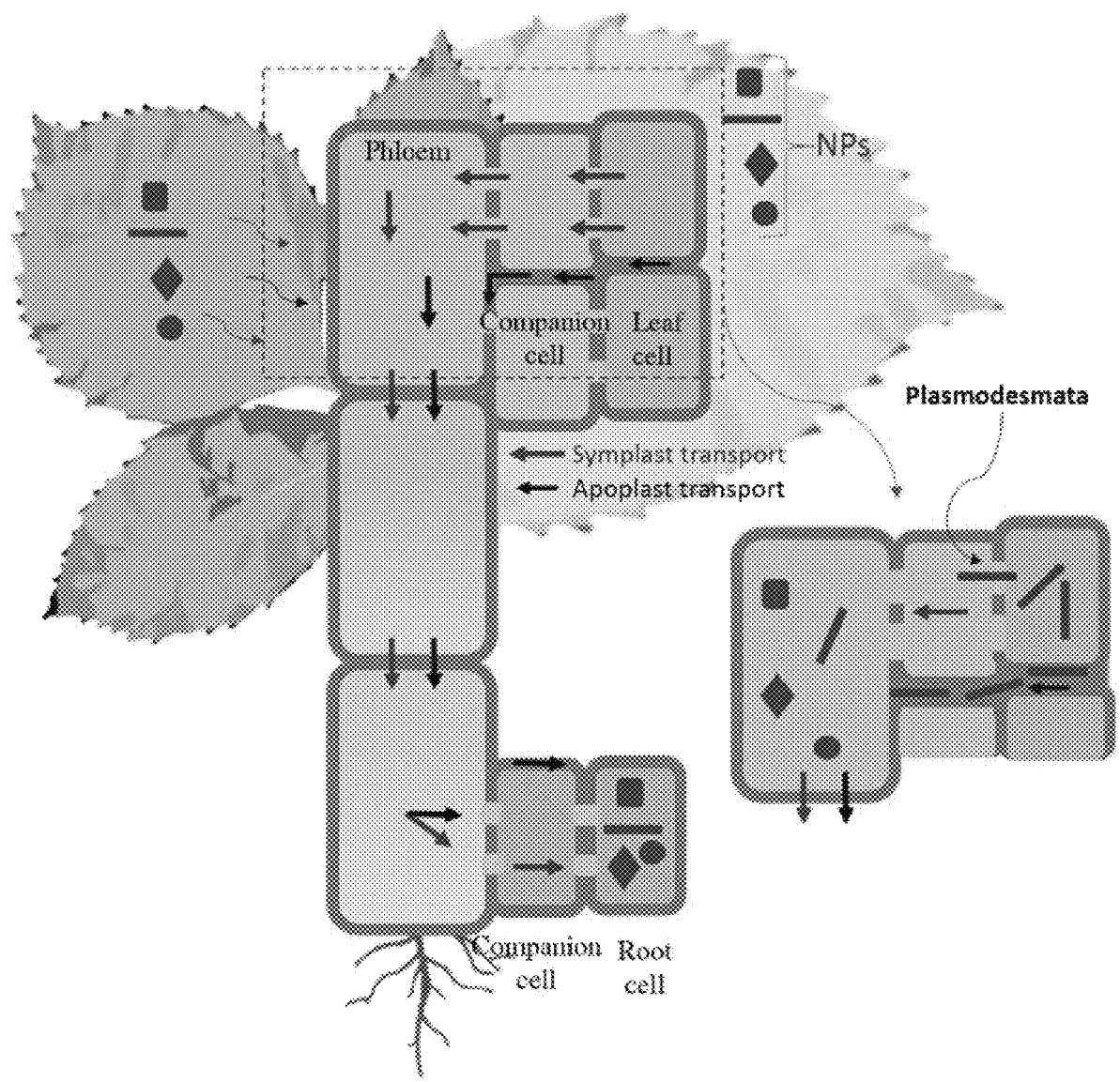
FIG. 15 depicts the mechanistic understanding of nanoparticle transport within plant cells. Representation describes how nanoparticles transport through Apoplast and Symplast pathway in plants cells along with pressure gradient or mass flow of photosynthate product. The inset represents the favourable transport of gold nanostructure (rod shape) more through Apoplast than Symplastic pathway. NPs=nanoparticles. Color gradient in the phloem represents the mass concentration of photosynthate with nanoparticles.

Foliar application increases uptake of nanoparticles by bypassing the cuticle, the primary barrier (Wang et al., 2013), although cuticle repels polar substances (Schwab et al., 2015). The stomatal pore in a typical plant leaf is approximately 100 nm in diameter (Schwab et al., 2015), presents a relatively large gap for the weak cuticle charge to sustain complete anion repulsion (Eichert and Goldbach 2008). Aerosol application method surpasses the cuticle barrier by delivering nanoparticles through the stomatal openings (FIG. 14B). The subsequent transport of Au NPs from shoot to root is then achieved by plant's vascular systems, portrayed schematically in FIG. 15. Cellular transport of nanoparticles carried out by both apoplast (through the wall) and symplast (cell to the cell, mediated by plasmodesmata). Apoplast pathway favors transport of larger particles (~200 nm) but symplast pathway favors smaller (<50 nm) particles (Schwab et al., 2015). The cellular transport limitation suggests that apoplast pathway is dominant for drop cast methods, whereas, symplast is more common for aerosol mediated delivery of nanoparticles. It also explains the reason for more transport of rod shape particles to roots though drop cast than aerosol approach. The rod-shaped NPs that penetrated or were internalized in the cell have more probability to remain in the plasmodesmata due to the high aspect (inset of FIG. 15). Once nanoparticles were internalized further, transport took place through the vascular system of the phloem. The pressure gradient of photosynthate in leaves driven a flow stream of nanoparticles and assist to move in phloem through phloem loading mechanism (Giaquinta 1983). This pathway of nanoparticle transport through the xylem and phloem has been verified previously (Wang et al., 2012, Raliya et al., 2015). As a result of vascular transport of Au nanoparticles in watermelon plants, they were found to accumulate in the root, stem and leaf to varying degrees, both due to particle morphology as well as the nanoparticle delivery technique. The study opens the door for investigation to use compatible metal nanostructure for targeted delivery of genetic material to plants.

In summary, cellular uptake and accumulation of gold nanoparticles within *Citrullus lanatus* was confirmed by ICP-MS after delivery through their leaf surface. Translocation of nanoparticles from leaf to root showed evidence that nanoparticles travel by the phloem transport mechanism. From the morphology-dependent trends in nanoparticle translocation, it can be concluded that accumulation and transport of nanoparticles depend on nanoparticle shape. Such trends were also influenced by the application method used. Application of nanoparticles by the aerosol method was most effective with structures with low aspect ratio, resulting in greater translocation than application by the drop-cast method. Conversely, the drop-cast method resulted in higher translocation of nanorods, which had a higher aspect ratio than other morphologies tested. This evidence suggests that different application methods may be optimal for delivery of different morphologies of nanoparticles to plants.

TABLE 4

Elemental analysis results of gold in plant sections by ICP-MS.

| Particle Morphology | Method | Amount in leaf (%) | Amount in stem (%) | Amount in root (%) | Percent difference, drop-cast vs. aerosol |
|---|---|---|---|---|---|
| Sphere | Drop-cast | 28.0 | 58.6 | 13.4 | 10.9 |
|  | Aerosol | 65.6 | 10.1 | 24.4 |  |
| Cube | Drop-cast | 57.9 | 34.8 | 7.3 | 2.3 |
|  | Aerosol | 60.6 | 29.8 | 9.6 |  |
| Rhombic dodecahedra | Drop-cast | 52.6 | 39.1 | 8.3 | 11.3 |
|  | Aerosol | 46.8 | 33.6 | 19.6 |  |
| Rod | Drop-cast | 27.4 | 23.4 | 49.3 | 37.4 |
|  | Aerosol | 34.0 | 54.1 | 11.8 |  |

TABLE 2

Test plan for the overall experiment.

| # | Experiment | Objective | Investigation Finding | Notes |
|---|---|---|---|---|
| 1 | Synthesis of Au nanostructures | To produce nanostructures with varying morphology | Sphere, cube, dodecahedral, and rod shape. Au nanostructures were synthesized in the range of 30-90 nm | UV-VIS spectroscopy, TEM confirmed morphology of Au nanostructures |
| 2 | Application of synthesized nanostructures to plants | To study Au nanostructure - watermelon plant interaction | Aqueous suspensions of AuNPs were diluted to 100 ppm and applied to watermelon leaves | Two foliar application methods were used: aerosol and drop-cast methods |
| 3 | Elemental analysis of Au concentrations in plant | To compare the efficacy of uptake, translocation and accumulation of various Au nanostructures | Spherical particles translocated to extend greatest by aerosol method; Rods translocated to greatest extent by drop-cast method | Elemental analysis performed using ICP-MS |

TABLE 3

Characterization data for nanoparticles in aqueous suspension.

| Particle Morphology | Particle Size$^a$ (nm) | Hydrodynamic Size$^c$ (nm) | PDI$^{c,d}$ | $\lambda_{max}^e$ (nm) | Zeta Potential$^e$ | Concentration, Au (ppm) |
|---|---|---|---|---|---|---|
| Sphere | 35 | 61.0 ± 31.6 | 0.457 | 527 | −40.5 | 2.29 × 10$^3$ |
| Truncated cube | 70 | 99.2 ± 25.1 | 0.034 | 563 | 56.7 | 1.12 × 10$^4$ |
| Rhombic dodecahedra | 65 | 99.8 ± 30.4 | 0.066 | 660 | 64.3 | 1.18 × 10$^4$ |
| Rod | 20, 60$^b$ | 114.1 ± 52.1 | 0.296 | 816 | 43.9 | 1.44 × 10$^3$ |

$^a$Mean geometric diameter, obtained from TEM images (FIG. 1A, FIG. 1B, FIG. 1C, and FIG. 1D)
$^b$Diameter, length
$^c$From DLS, number based on particle size distribution (FIG. 3)
$^d$Polydispersity index
$^e$Surface Plasmon Resonance, obtained from maximum UV-vis peak (FIG. 1C)

References for Example 3

Albanese, A., Tang, P. S. and Chan, W. C. (2012). The effect of nanoparticle size, shape, and surface chemistry on biological systems. *Ann. Rev. Biomed. Eng.*, 14, 1-16.

Becker, R., Liedberg, B. and Kall, P.-O. (2010). CTAB promoted synthesis of Au nanorods—Temperature effects and stability considerations. *J. Colloid Interface Sci.*, 343, 25-30.

Biswas, P. and Wu, C.-Y. (2005). Nanoparticles and the environment. *J. Air Waste Manag. Assoc.*, 55, 708-746.

Brandt, O., Rajathurai, A. M. and Roth, P. (1987). First observations on break-up of particle agglomerates in shock waves. *Experiment. Fluids*, 5, 86-94.

Capaldi Arruda, S. C., Diniz Silva, A. L., Moretto Galazzi, R., Antunes Azevedo, R. and Zezzi Arruda, M. A. (2015). Nanoparticles applied to plant science: A review. *Talanta*, 131, 693-705.

Chen, H., Seiber, J. N. and Hotze, M. (2014). ACS select on nanotechnology in food and agriculture: A perspective on implications and applications. *J. Agri. Food Chem.*, 62, 1209-1212.

DeRosa, M. C., Monreal, C., Schnitzer, M., Walsh, R. and Sultan, Y. (2010). Nanotechnology in fertilizers. *Nat. Nanotech.*, 5, 91-91.

Eichert, T. and Goldbach, H. E. (2008). Equivalent pore radii of hydrophilic foliar uptake routes in stomatous and astomatous leaf surfaces—further evidence for a stomatal pathway. *Physiologia Planta.*, 132, 491-502.

Ghosh, P. S., Kim, C.-K., Han, G., Forbes, N. S. and Rotello, V. M. (2008). Efficient gene delivery vectors by tuning the surface charge density of amino acid-functionalized gold nanoparticles. *ACS Nano*, 2, 2213-2218.

Giaquinta, R. T. (1983). Phloem loading of sucrose. *Ann. Rev. Plant Physiol.*, 34, 347-387.

González-Melendi, P., Fernandez-Pacheco, R., Coronado, M. J., Corredor, E., Testillano, P., Risueño, M. C., Marquina, C., Ibarra, M. R., Rubiales, D. and Pérez-de-Luque, A. (2008). Nanoparticles as smart treatment-delivery systems in plants: assessment of different techniques of microscopy for their visualization in plant tissues. *Annal. Botany*, 101, 187-195.

Hautier, Y., Seabloom, E. W., Borer, E. T., Adler, P. B., Harpole, W. S., Hillebrand, H., Lind, E. M., MacDougall, A. S., Stevens, C. J. and Bakker, J. D. (2014). Eutrophication weakens stabilizing effects of diversity in natural grasslands. *Nature*, 508, 521-525.

Jiang, J., Oberdörster, G., Elder, A., Gelein, R., Mercer, P. and Biswas, P. (2008). Does nanoparticle activity depend upon size and crystal phase? *Nanotoxicol.*, 2, 33-42.

Liu, R. and Lal, R. (2014). Synthetic apatite nanoparticles as a phosphorus fertilizer for soybean (*Glycine max*). *Scientific Rep.*, 4, Liu, R. and Lal, R. (2015). Potentials of engineered nanoparticles as fertilizers for increasing agronomic productions. *Sci. Total Env.*, 514, 131-139.

Nair, R., Varghese, S. H., Nair, B. G., Maekawa, T., Yoshida, Y. and Kumar, D. S. (2010). Nanoparticulate material delivery to plants. *Plant Sci.*, 179, 154-163.

Peng, J., Sun, Y., Liu, Q., Yang, Y., Zhou, J., Feng, W., Zhang, X. and Li, F. (2012). Upconversion nanoparticles dramatically promote plant growth without toxicity. *Nano Res.*, 5, 770-782.

Raliya, R., Nair, R., Chavalmane, S., Wang, W.-N. and Biswas, P. (2015). Mechanistic evaluation of translocation and physiological impact of titanium dioxide and zinc oxide nanoparticles on the tomato (*Solanum lycopersicum* L.) plant. *Metallomics*, 7, 1584-1594.

Raliya, R. and Tarafdar, J. (2013). ZnO nanoparticle biosynthesis and its effect on phosphorous-mobilizing enzyme secretion and gum contents in Clusterbean (*Cyamopsis tetragonoloba* L.). *Agr. Res.*, 2, 48-57.

Raliya, R., Tarafdar, J., Singh, S., Gautam, R., Choudhary, K., Maurino, V. G. and Saharan, V. (2014). MgO Nanoparticles Biosynthesis and Its Effect on Chlorophyll Contents in the Leaves of Clusterbean (*Cyamopsis tetragonoloba* L.). *Adv. Sci., Eng. Med.*, 6, 538545.

Raliya, R., Tarafdar, J. C. and Biswas, P. (2016). Enhancing the Mobilization of Native Phosphorus in the Mung Bean Rhizosphere Using ZnO Nanoparticles Synthesized by Soil Fungi. *J. Agri. Food Chem.*, 64, 3111-3118.

Raliya, R., Nair, R., Chavalmane, S., Wang, W. N. and Biswas, P. (2015). Mechanistic evaluation of translocation and physiological impact of titanium dioxide and zinc oxide nanoparticles on the tomato (*Solanum lycopersicum* L.) plant. Metallomics, 7, 1584-1594.

Saharan, V., Sharma, G., Yadav, M., Choudhary, M. K., Sharma, S., Pal, A., Raliya, R. and Biswas, P. (2015). Synthesis and in vitro antifungal efficacy of Cu-chitosan nanoparticles against pathogenic fungi of tomato. *Int. J. Biol. Macromol.*, 75, 346-353.

Scheffer, A., Engelhard, C., Sperling, M. and Buscher, W. (2008). ICP-MS as a new tool for the determination of gold nanoparticles in bioanalytical applications. *Analyt. Bioanalytic. Chem.*, 390, 249-252.

Schwab, F., Zhai, G., Kern, M., Turner, A., Schnoor, J. L. and Wiesner, M. R. (2015). Barriers, pathways and processes for uptake, translocation and accumulation of nanomaterials in plants—Critical review. *Nanotoxicol.*, DOI:10.3109/17435390.17432015.11048326.

Shukla, R., Bansal, V., Chaudhary, M., Basu, A., Bhonde, R. R. and Sastry, M. (2005). Biocompatibility of Gold Nanoparticles and Their Endocytotic Fate Inside the Cellular Compartment: A Microscopic Overview. *Langmuir*, 21, 10644-10654.

Smith, V. H., Tilman, G. D. and Nekola, J. C. (1999). Eutrophication: impacts of excess nutrient inputs on freshwater, marine, and terrestrial ecosystems. *Env. Pollut.*, 100, 179-196.

Tarafdar, J., Raliya, R., Mahawar, H. and Rathore, I. (2014). Development of zinc nanofertilizer to enhance crop production in pearl millet (*Pennisetum americanum*). *Agri. Res.*, 3, 257-262.

Thakor, A. S., Jokerst, J., Zavaleta, C., Massoud, T. F. and Gambhir, S. S. (2011). Gold nanoparticles: a revival in precious metal administration to patients. *Nano Lett.*, 11, 4029-4036.

Wang, W.-N., Tarafdar, J. C. and Biswas, P. (2013). Nanoparticle synthesis and delivery by an aerosol route for watermelon plant foliar uptake. *J. Nanopart. Res.*, 15, 1413-1417.

Wang, Z., Xie, X., Zhao, J., Liu, X., Feng, W., White, J. C. and Xing, B. (2012). Xylem- and phloem-based transport of CuO nanoparticles in maize (*Zea mays* L.). *Env. Sci. Technol.*, 46, 4434-4441.

Wei, J., Liu, H., Liu, F., Zhu, M., Zhou, X. and Xing, D. (2014). Miniaturized paper-based gene sensor for rapid and sensitive identification of contagious plant virus. *ACS Appl. Mat. Interfaces*, 6, 22577-22584.

Wibowo, D., Zhao, C. X., Peters, B. C. and Middelberg, A. P. J. (2014). Sustained Release of Fipronil Insecticide in Vitro and in Vivo from Biocompatible Silica Nanocapsules. *J. Agri. Food Chem.*, 62, 12504-12511.

Wu, H.-L., Kuo, C.-H. and Huang, M. H. (2010). Seed-Mediated Synthesis of Gold Nanocrystals with Systematic Shape Evolution from Cubic to Trisoctahedral and Rhombic Dodecahedral Structures. *Langmuir*, 26, 12307-12313.

Yang, Y., Wang, Y., Westerhoff, P., Hristovski, K., Jin, V. L., Johnson, M.-V. V. and Arnold, J. G. (2014). Metal and nanoparticle occurrence in biosolid-amended soils. *Sci. Total Env.*, 485, 441-449.

Zhao, W., Lu, J., Ma, W., Xu, C., Kuang, H. and Zhu, S. (2011). Rapid on-site detection of *Acidovorax avenae* subsp. *citrulli* by gold-labeled DNA strip sensor. *Biosens. Bioelectron.*, 26, 4241-4244.

Figure 16:
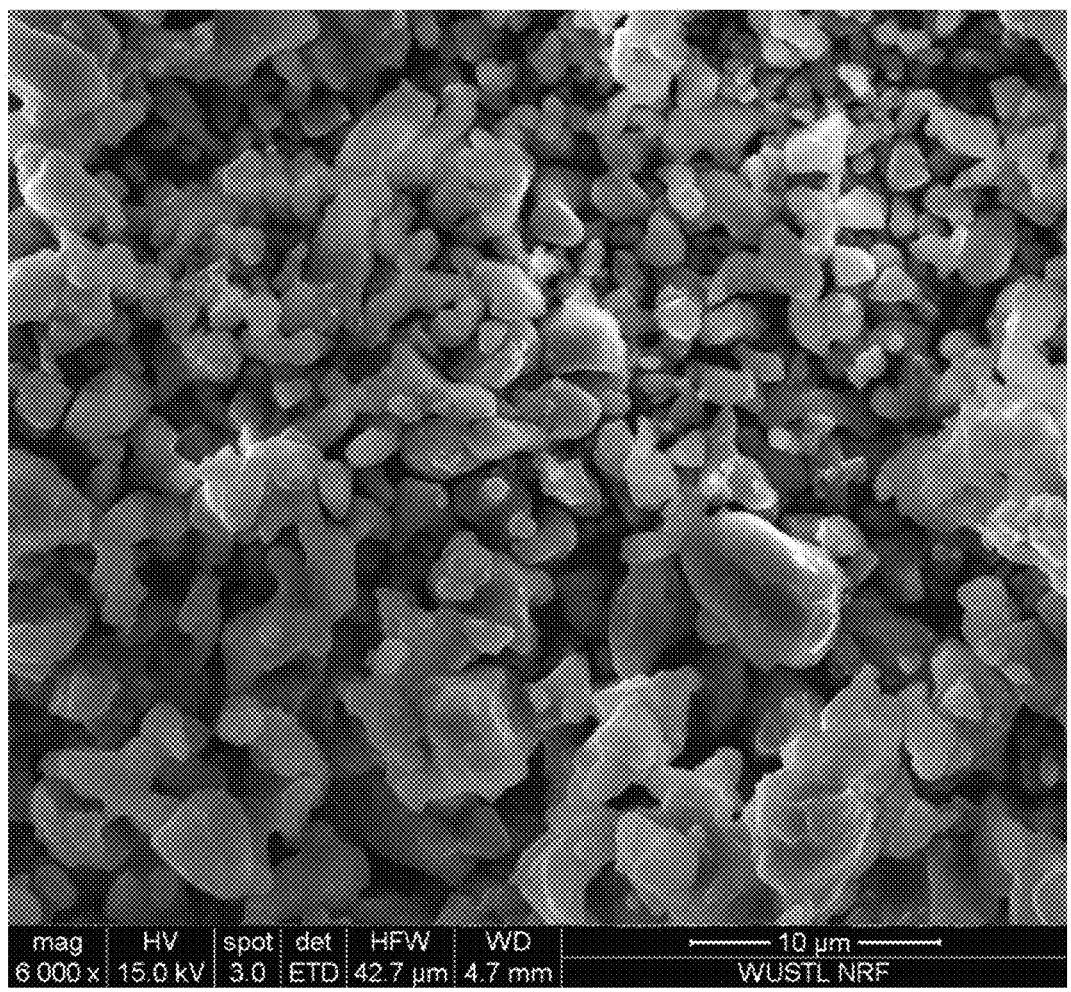
FIG. 16 depicts a scanning electron microscopy analysis of synthesized nanofertilizer containing N and P.

Example 4. One Step Synthesis of Nitrogen (N) and Phosphorus (P) Nanocomposite for its Controlled Release and Enhancing Use Efficiency The nanocomposites of N and P together with chitosan was prepared using the matrix of N, P, and chitin precursor molecules and/or compounds. The experiment of nanocomposite synthesis was carried out using various precursor salts to control the chemical composition and nature of the element in the eventual composite particles. As a source of N, urea, mono ammonium, and di ammonium salt were used, whereas, hydroxyapatite and phosphate salts were used as P source in the composite. Nanoscale chitosan polymer was prepared at an upstream step using ionic gelation reaction of chitin and tri-polyphosphate. All three primary source (for N, P and Chitosan) of composite were separately atomized in the Furnace Aerosol Reactor (FuAR) using 6 and 24 jet nebulizer while controlling three independent steps of the reaction—a) the droplet size of the solvent b) nucleation of the precursor particles in a droplet and c) solvent evaporation. The final product was the composite of N and P embedded in the chitosan polymer at nanoscale (FIG. 16). Furthermore, mass transfer concept and aerosol technology will allow us to control chemical composition (N to P ratio) and nature (plant available mineral N and P forms) of the composite.

Figure 17:
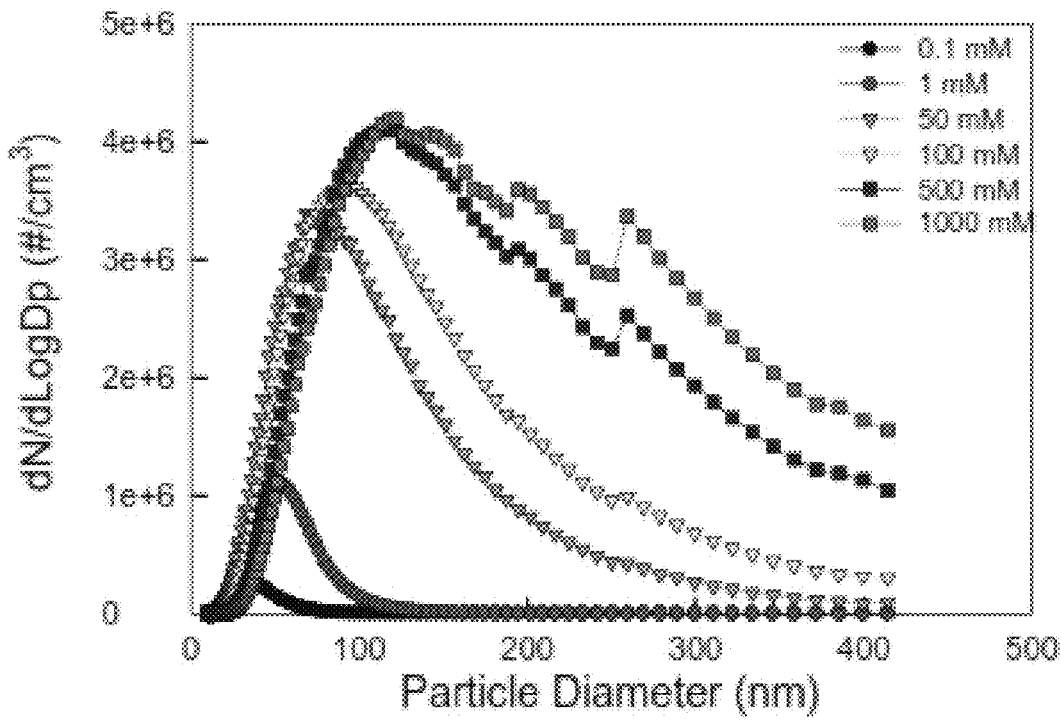
FIG. 17 depicts a graph showing particle concentration (#/cm$^3$) as a function of particle diameter (nm) plotted for 6 different precursor concentrations of $(NH_4)_3PO_4$.
Figure 18:
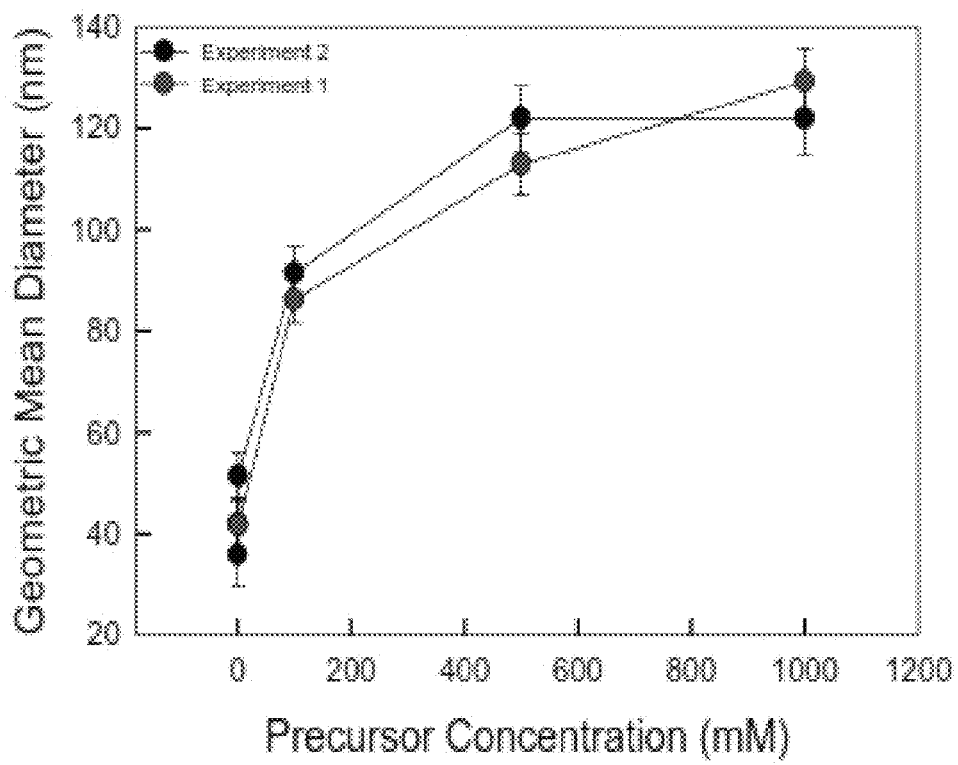
FIG. 18 depicts a graph showing geometric mean particle diameter (nm) plotted as a function of precursor salt concentration (mM) for two different experiments (each of five replicates). The results from repeated experiments shows consistency in the particle size, thus represented reproducibility of the results.
Figure 19:
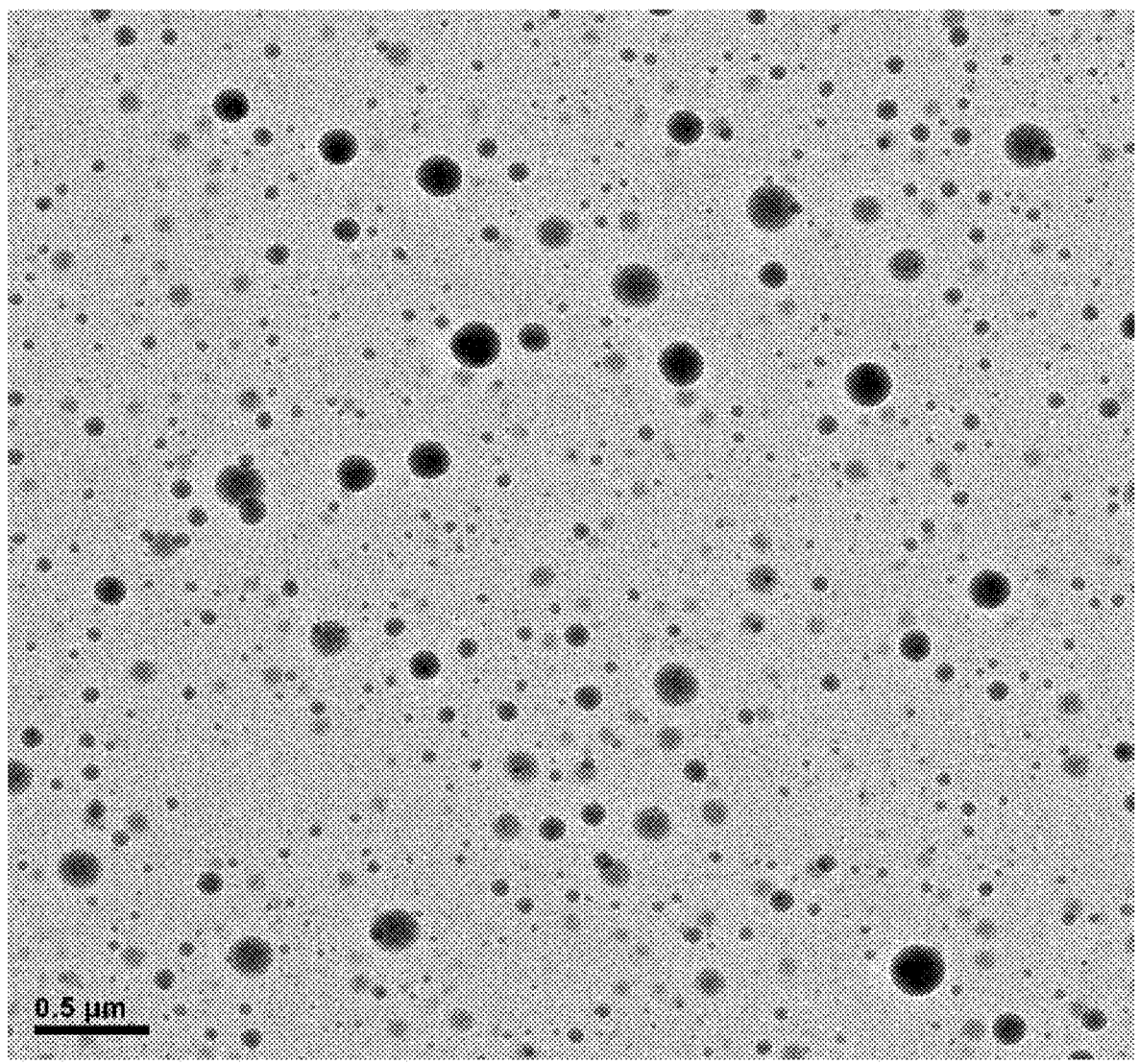
FIG. 19 depicts a transmission electron microscopy analysis of synthesized nanofertilizer containing N and P.

Example 5. Effect of Precursor Salt Concentration on Particle Size of the Nanocomposite Experiments with six different precursor salt concentrations (0.1 mM to 1000 mM) were performed to determine ideal concentration of $(NH_4)_3PO_4$ for the synthesis of N and P nanocomposite. The size distribution of the particles were measured using the scanning mobility particle sizer (SMPS). It was observed that lower salt concentrations caused a decrease in mean particle diameter and were more monodispersed (FIG. 17), and repeated experiments also showed the reproducibility of the data generated (FIG. 18). Furthermore, the results of SMPS in which broad size distribution of the particles were observed, also corroborate when it was analyzed by the transmission electron microscope (FIG. 19).

What is claimed is:

1. A powder composition consisting of:
   (a) a plurality of nanocomposite particles each comprising a nanocomposite, wherein the nanocomposite particles have a particle size of about 25 nm to about 500 nm and are soluble in water, wherein each of the nanocomposite particles consists essentially of a combination of nitrogen, phosphorous, and potassium, and wherein each of the nanocomposite particles excludes chitosan, and
   (b) a plurality of metal oxide nanoparticles consisting of metal oxide.

2. The composition of claim 1, wherein the nanocomposite particles comprise at least about 50% available phosphorus.

3. The composition of claim 1, wherein the nanocomposite particles comprise at least about 20% nitrogen.

4. The composition of claim 1, wherein the nanocomposite particles comprise at least about 20% potassium.

5. The composition of claim 1, wherein the nanocomposite particles have a particle size of about 100 nm.

6. The composition of claim 1, wherein the metal oxide nanoparticles are about 25 nm.

7. The composition of claim 1, wherein the metal oxide nanoparticles are ZnO.

8. A method of delivering the powder composition of claim 1 to a plant, the method comprising administering the composition via aerosol.

9. The method of claim 8, wherein the delivery increases the fresh weight of biomass in the plant.

10. The method of claim 8, wherein the fresh weight of biomass is increased by greater than 20% relative to a plant administered conventional fertilizer.

11. The method of claim 8, wherein the nanocomposite particles are administered at about 100 mg/kg of a nutrient formulation containing the nanocomposite particles.

12. A method of making the nanocomposite particles of claim 1, the method comprising: (a) using a furnace aerosol reactor comprising an atomizer unit, a hot air oven, and a collection unit, generating one or more aerosol droplets of a precursor solution in the atomizer unit; (b) passing the aerosol droplets through hot air oven to form nanocomposite particles; and (c) collecting the nanocomposite particles using the collection unit, wherein the precursor solution comprises nitrogen, phosphorous, and potassium.

13. The method of claim 12, wherein the method does not generate any byproduct chemical and/or no further downstream processing is required.

14. The method of claim 12, wherein the hot-air oven has a temperature of about 25° C. to about 250° C.

15. The method of claim 12, wherein the pressure of the atomizing unit is about 40 PSI.

16. A method of customizing nanocomposite particles to a plant, the method comprising determining the amount of nitrogen, phosphorous and potassium needed by the plant and making nanocomposite particles according to the method of claim 12, with the determined amounts of nitrogen, phosphorous and potassium.

17. The method of claim 16, wherein the method further comprises determining the ratio/amount of nanocomposite particles added, the size of the nanocomposite particles, the shape of the nanocomposite particles, and/or type of nanocomposite particles, and making a composition comprising the nanocomposite particles.

* * * * *